US012587238B2

(12) United States Patent
Akl et al.

(10) Patent No.: US 12,587,238 B2
(45) Date of Patent: Mar. 24, 2026

(54) MECHANICAL STATE CONFIGURATION

(71) Applicant: QUALCOMM Incorporated, San Diego, CA (US)

(72) Inventors: Naeem Akl, Bridgewater, NJ (US); Navid Abedini, Basking Ridge, NJ (US); Tao Luo, San Diego, CA (US); Weimin Duan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 20 days.

(21) Appl. No.: 18/610,811

(22) Filed: Mar. 20, 2024

(65) Prior Publication Data

US 2025/0300696 A1 Sep. 25, 2025

(51) Int. Cl.
| | |
|---|---|
| *H04L 23/02* | (2006.01) |
| *H04B 7/02* | (2018.01) |
| *H04W 28/08* | (2023.01) |
| *H04W 72/542* | (2023.01) |

(52) U.S. Cl.
CPC ........ *H04B 7/028* (2013.01); *H04W 28/0975* (2020.05); *H04W 72/542* (2023.01)

(58) Field of Classification Search
CPC ............... H04W 16/28; H04W 72/085; H04W 72/0493; H04W 52/146; H04W 72/23; H04L 65/70; H04L 65/762; H04L 5/0096; H04L 5/0023; H04L 5/0094; H04B 7/0695; H04B 7/0404; H04B 7/088; H04B 7/0857
USPC .................................. 375/262, 260, 267, 299
See application file for complete search history.

(56) References Cited

U.S. PATENT DOCUMENTS

| | | | |
|---|---|---|---|
| 2017/0195894 A1* | 7/2017 | Wen ....................... | H04W 72/53 |
| 2021/0306064 A1 | 9/2021 | Abedini et al. | |
| 2023/0188308 A1* | 6/2023 | Karjalainen ......... | H04B 7/0408 |
| | | | 370/336 |
| 2023/0261717 A1 | 8/2023 | Ma et al. | |
| 2023/0276309 A1 | 8/2023 | Xu et al. | |
| 2023/0309077 A1* | 9/2023 | Metwaly ............. | H04W 72/046 |
| 2024/0356695 A1* | 10/2024 | Karjalainen ......... | H04B 7/0691 |

FOREIGN PATENT DOCUMENTS

WO 2025065331 A1 4/2025

OTHER PUBLICATIONS

International Search Report and Written Opinion—PCT/US2025/016028—ISA/EPO—Jul. 29, 2025.
Partial International Search Report—PCT/US2025/016028—ISA/EPO—May 13, 2025.

* cited by examiner

*Primary Examiner* — Khai Tran
(74) *Attorney, Agent, or Firm* — Harrity & Harrity, LLP

(57) ABSTRACT

Various aspects of the present disclosure generally relate to wireless communication. In some aspects, a user equipment (UE) may transmit one or more indications, wherein at least one of the one or more indications indicates a latency associated with switching a spatial direction of an antenna. The UE may receive a configuration. The UE may transmit or receive a communication in accordance with the configuration and the one or more indications. Numerous other aspects are described.

20 Claims, 12 Drawing Sheets

810 Transmit one or more indications, wherein at least one of the one or more indications indicates a latency associated with switching a spatial direction of an antenna 820 Receive a configuration 830 Transmit or receive a communication in accordance with the one or more indications

800

910 Transmit, to network node, an indication for support of a mechanical state associated with a reference signal 920 Receive, from the network node, a configuration to apply the mechanical state 930 Transmit or receive a communication in accordance with the configuration to apply the mechanical state

900

1010 Transmit, to a second network node, an indication for support of a mechanical state associated with a reference signal 1020 Receive, from the second network node, a configuration to apply the mechanical state 1030 Transmit or receive a communication in accordance with the configuration to apply the mechanical state

1000

MECHANICAL STATE CONFIGURATION

FIELD OF THE DISCLOSURE

Aspects of the present disclosure generally relate to wireless communication and specifically relate to techniques, apparatuses, and methods for configurations for mechanical states.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

SUMMARY

In some aspects, a method of wireless communication performed by a user equipment (UE) includes transmitting one or more indications, wherein at least one of the one or more indications indicates a latency associated with switching a spatial direction of an antenna; receiving a configuration; and transmitting or receiving a communication in accordance with the configuration and one or more indications.

In some aspects, a method of wireless communication performed by a UE includes transmitting, to a network node, an indication for support of a mechanical state associated with a reference signal; receiving, from the network node, a configuration to apply the mechanical state; and transmitting or receiving a communication in accordance with the configuration.

In some aspects, a method of wireless communication performed by a first network node includes transmitting, to a second network node, an indication for support of a mechanical state associated with a reference signal; receiving, from the second network node, a configuration to apply the mechanical state; and transmitting or receiving a communication in accordance with the configuration.

In some aspects, a UE includes one or more memories; and one or more processors, coupled to the one or more memories, configured to cause the UE to: transmit one or more indications, wherein at least one of the one or more indications indicates a latency associated with switching a spatial direction of an antenna; receive a configuration; and transmit or receive a communication in accordance with the configuration and the one or more indications.

In some aspects, a UE for wireless communication includes one or more memories; and one or more processors, coupled to the one or more memories, configured to cause the UE to: transmit, to a network node, an indication for support of a mechanical state associated with a reference signal; receive, from the network node, a configuration to apply the mechanical state; and transmit or receive a communication in accordance with the configuration.

In some aspects, a first network node for wireless communication includes one or more memories; and one or more processors, coupled to the one or more memories, configured to cause the first network node to: transmit, to a second network node, an indication for support of a mechanical state associated with a reference signal; receive, from the second network node, a configuration to apply the mechanical state; and transmit or receive a communication in accordance with the configuration.

In some aspects, a non-transitory computer-readable medium storing a set of instructions for wireless communication includes one or more instructions that, when executed by one or more processors of a UE, cause the UE to: transmit one or more indications, wherein at least one of the one or more indications indicates a latency associated with switching a spatial direction of an antenna; receive a configuration; and transmit or receive a communication in accordance with the configuration and the one or more indications.

In some aspects, a non-transitory computer-readable medium storing a set of instructions for wireless communication includes one or more instructions that, when executed by one or more processors of a UE, cause the UE to: transmit, to a network node, an indication for support of a mechanical state associated with a reference signal; receive, from the network node, a configuration to apply the mechanical state; and transmit or receive a communication in accordance with the configuration.

In some aspects, a non-transitory computer-readable medium storing a set of instructions for wireless communication includes one or more instructions that, when executed by one or more processors of a first network node, cause the first network node to: transmit, to a second network node, an indication for support of a mechanical state associated with a reference signal; receive, from the second network node, a configuration to apply the mechanical state; and transmit or receive a communication in accordance with the configuration.

In some aspects, a non-transitory computer-readable medium storing a set of instructions for wireless communication includes one or more instructions that, when executed by one or more processors of a UE, cause the UE to: transmit one or more indications, wherein at least one of the one or more indications indicates a latency associated with switching a spatial direction of an antenna; receive a configuration; and transmit or receive a communication in accordance with the configuration and the one or more indications.

In some aspects, a non-transitory computer-readable medium storing a set of instructions for wireless communication includes one or more instructions that, when executed by one or more processors of a UE, cause the UE to: transmit, to a network node, an indication for support of a mechanical state associated with a reference signal; receive, from the network node, a configuration to apply the mechanical state; and transmit or receive a communication in accordance with the configuration.

In some aspects, a non-transitory computer-readable medium storing a set of instructions for wireless communication includes one or more instructions that, when executed by one or more processors of a first network node, cause the first network node to: transmit, to a second network node, an indication for support of a mechanical state associated with a reference signal; receive, from the second network node, a configuration to apply the mechanical state; and transmit or receive a communication in accordance with the configuration.

In some aspects, an apparatus for wireless communication includes means for transmitting one or more indications, wherein at least one of the one or more indications indicates a latency associated with switching a spatial direction of an antenna; means for receiving a configuration; and means for transmitting or receiving a communication in accordance with the configuration and the one or more indications.

In some aspects, an apparatus for wireless communication includes means for transmitting, to a network node, an indication for support of a mechanical state associated with a reference signal; means for receiving, from the network node, a configuration to apply the mechanical state; and means for transmitting or receiving a communication in accordance with the configuration.

In some aspects, an apparatus for wireless communication includes means for transmitting, to a network node, an indication for support of a mechanical state associated with a reference signal; means for receiving, from the network node, a configuration to apply the mechanical state; and means for transmitting or receiving a communication in accordance with the configuration.

In some aspects, an apparatus for wireless communication includes means for transmitting a first indication of one or more of a plurality of mechanical states, wherein the plurality of mechanical states includes a first state and a second state, wherein each of the first state and the second state is associated with a spatial direction; means for receiving a configuration; means for receiving a second indication that associates the configuration to one or more of the first state or the second state; and means for transmitting or receiving a communication in accordance with the configuration and one or more of the first state or the second state as indicated by the second indication.

In some aspects, an apparatus for wireless communication includes means for transmitting, to a network node, an indication for support of a mechanical state associated with a reference signal; means for receiving, from the network node, a configuration to apply the mechanical state; and means for transmitting or receiving a communication in accordance with the configuration.

In some aspects, an apparatus for wireless communication includes means for transmitting, to a network node, an indication for support of a mechanical state associated with a reference signal; means for receiving, from the network node, a configuration to apply the mechanical state; and means for transmitting or receiving a communication in accordance with the configuration.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

5

Figure 10:
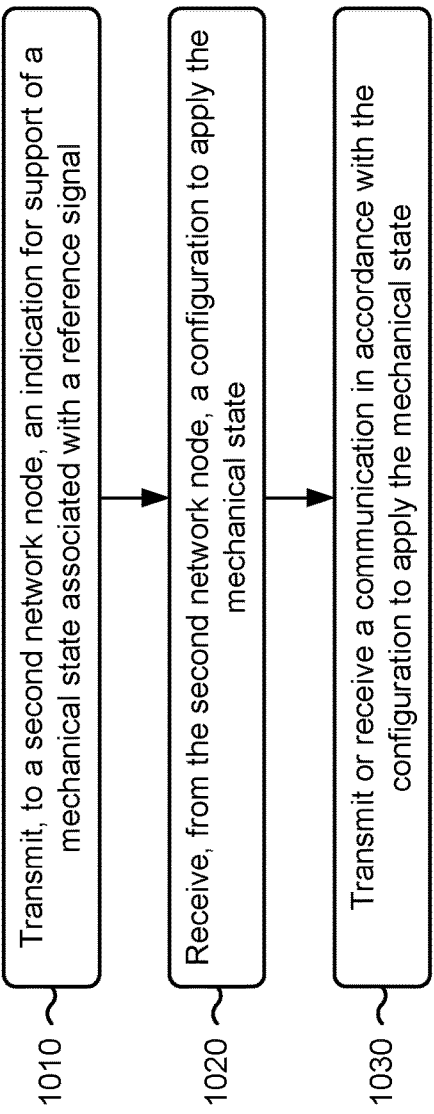

FIG. 10 is a diagram illustrating an example process performed, for example, at a first network node or an apparatus of a first network node, in accordance with the present disclosure.

Figure 11:
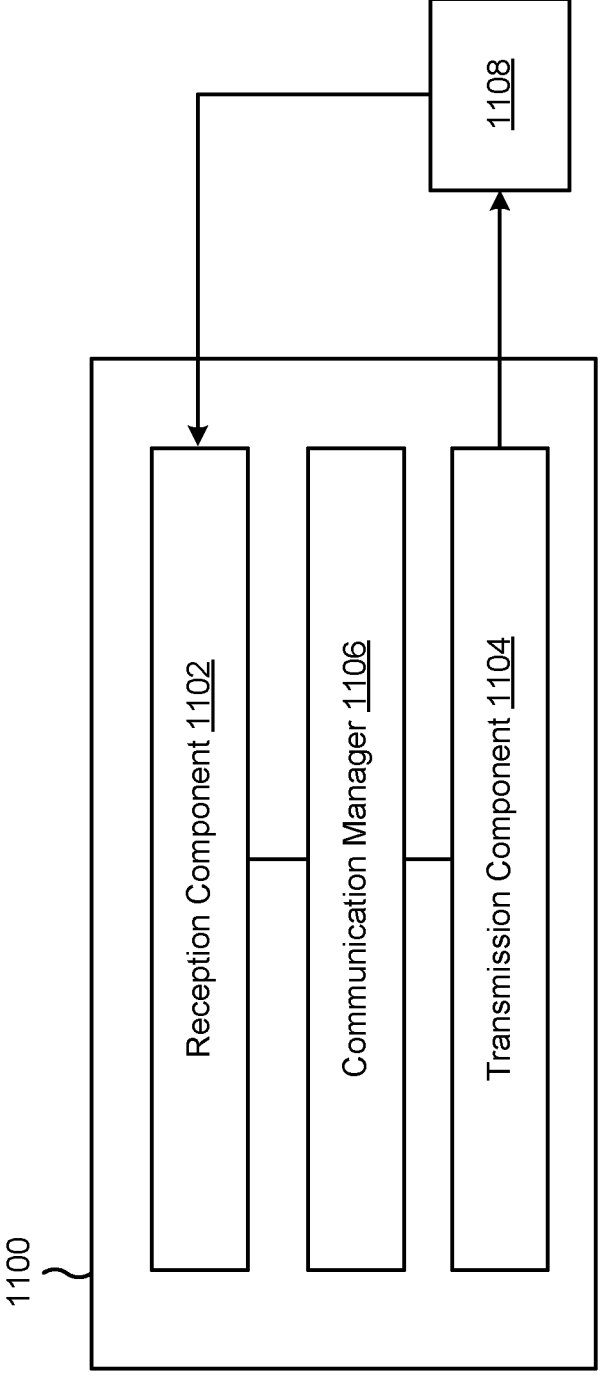

FIG. 11 is a diagram of an example apparatus for wireless communication, in accordance with the present disclosure.

Figure 12:
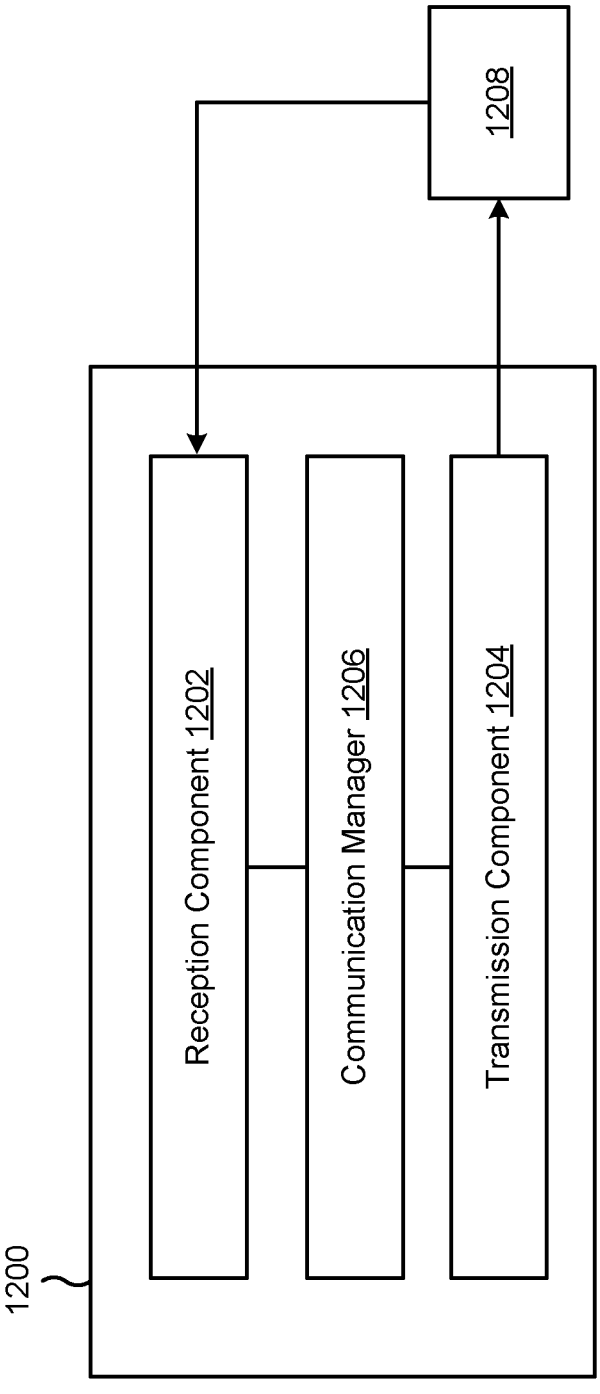

FIG. 12 is a diagram of an example apparatus for wireless communication, in accordance with the present disclosure.

DETAILED DESCRIPTION

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

"Mobile termination" refers to a process where a call or a data session is ended or terminated at a mobile device, such as a user equipment (UE). In some networks, mobile termination also involves ensuring that the communication is handed off successfully to an end device with minimal delay and with a high quality of service.

A mobile termination scheme may use one or more network-controlled repeaters (NCRs). The NCRs may each include mobile termination (NCR-MT) that provides a control link (C-link) to a network node (such as a gNodeB (gNB)) for exchanging side control information. The C-link may be facilitated via a Uu interface. The NCR may include radio frequency (RF) forwarding (NCR-FWD). The NCR-FWD may amplify and forward uplink and/or downlink RF signals between the network node and the UE. The network node may control operation of the NCR-FWD via communications made to the NCR via the C-link. NCRs may serve as inband RF repeaters that extend coverage for FR1 and/or FR2 networks. The NCR may be single-hop stationary and transparent to the UE. Moreover, the network may maintain the links between the network node and the NCR, and between the NCR and the UE simultaneously.

Some UEs may be equipped with mechanical beam steering. For example, a UE may have one or more antenna apertures with a limited field of view. To provide a larger field of view, the UE may mechanically rotate one or more antennas to different mechanical states (also herein referred to as "states") that point the one or more antennas in different spatial directions (e.g., different angles and/or positions). The UE may mechanically rotate the one or more antennas such that different communication directions (e.g., uplink communications, downlink communications, communications with a different network device, etc.) occur via different spatial directions of the antennas. Mechanically moving the antennas, however, can introduce issues such as increased latency. For instance, moving the antenna between different spatial positions (e.g., from a first mechanical state to a second mechanical state or from the first mechanical state to a third mechanical state) may introduce different amounts of latency. The difference in latency can introduce issues in communication between the UE and other network components.

Various aspects relate generally to mechanical state configurations. Some aspects more specifically relate to configurations for an NCR-MT (incorporated into a UE or network node) to communicate with other devices via the network and in accordance with multiple spatial directions of one or more antennas. In some aspects, the NCR-MT may transmit or receive communications in accordance with the configuration and mechanical states indicated by the NCR-MT.

Particular aspects of the subject matter described in this disclosure can be implemented to realize one or more of the following potential advantages. In some examples, by indicating one or more of a spatial direction or a latency associated with switching the spatial direction, a device (e.g., the NCR-MT) can apply the described techniques to communicate with multiple network devices using a single antenna that can move to multiple states without introducing issues that may degrade performance, such as increased latency or overhead.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, RF sensing, and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

Figure 1:
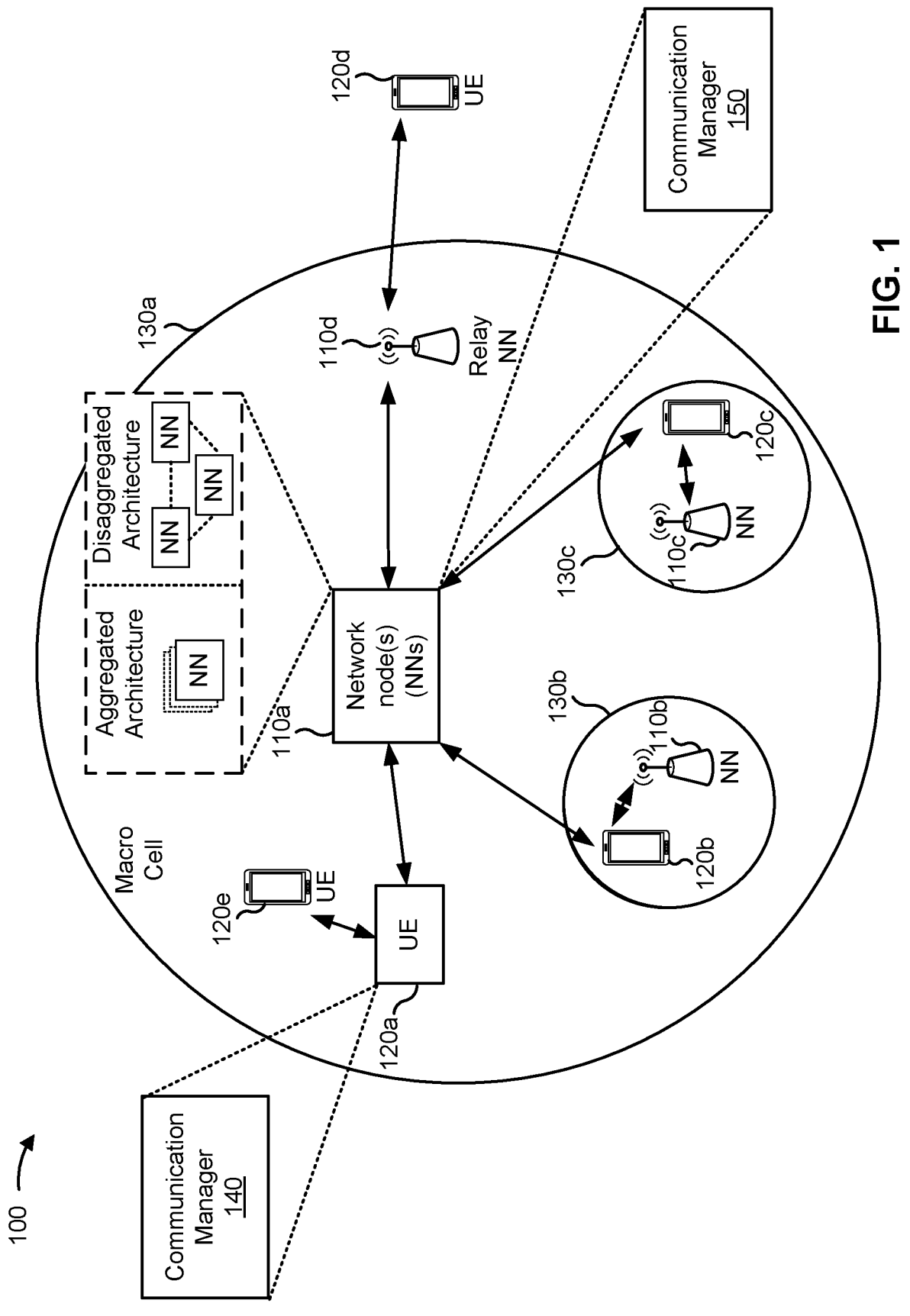
FIG. 1 is a diagram illustrating an example of a wireless communication network in accordance with the present disclosure.

FIG. 1 is a diagram illustrating an example of a wireless communication network 100 in accordance with the present disclosure. The wireless communication network 100 may be or may include elements of a 5G (or NR) network or a 6G network, among other examples. The wireless communication network 100 may include multiple network nodes 110, shown as a network node (NN) 110a, a network node 110b, a network node 110c, and a network node 110d. The network nodes 110 may support communications with multiple UEs 120, shown as a UE 120a, a UE 120b, a UE 120c, a UE 120d, and a UE 120e.

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless networks 100 may be deployed in a given geographic area. Each wireless communication network 100 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHZ), FR2 (24.25 GHz through 52.6 GHz), FR3 (7.125 GHz through 24.25 GHz), FR4a or FR4-1 (52.6 GHz through 71 GHz), FR4 (52.6 GHz through 114.25 GHZ), and FR5 (114.25 GHz through 300 GHz). Although a portion of FR1 is greater than 6 GHz, FR1 is often referred to (interchangeably) as a "Sub-6 GHZ" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHZ," if used herein, may broadly refer to frequencies that are less than 6 GHZ, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/LTE and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 110 may include one or more devices, components, or systems that enable communication between a UE 120 and one or more devices, components, or systems of the wireless communication network 100. A network node 110 may be, may include, or may also be referred to as an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node (having an aggregated architecture), meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. For example, a disaggregated network node may have a disaggregated architecture. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (Cus), one or more distributed units (Dus), and/or one or more radio units (Rus). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (iFFT), beamforming, physical random access channel (PRACH) extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single network node 110 may include a combination of one or more Cus, one or more Dus, and/or one or more Rus. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or an NTN network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110a may be a macro network node for a macro cell 130a, the network node 110b may be a pico network node for a pico cell 130b, and the network node 110c may be a femto network node for a femto cell 130c. Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel may be used to transmit downlink control information (DCI) (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more physical downlink control channels (PDCCHs), and downlink data channels may include one or more physical downlink shared channels (PDSCHs). Uplink channels may similarly include one or more control channels and one or more data channels. An uplink control channel may be used to transmit uplink control information (UCI) (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more physical uplink shared channels (PUSCHs). The downlink and the uplink may each include a set of resources on which the network node 110 and the UE 120 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a DCI configuration to the one or more UEs 120) and/or reconfigured, which means that a BWP can be adjusted in real-time (or near-real-time)

based on changing network conditions in the wireless communication network 100 and/or based on the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

As described above, in some aspects, the wireless communication network 100 may be, may include, or may be included in, an IAB network. In an IAB network, at least one network node 110 is an anchor network node that communicates with a core network. An anchor network node 110 may also be referred to as an IAB donor (or "IAB-donor"). The anchor network node 110 may connect to the core network via a wired backhaul link. For example, an Ng interface of the anchor network node 110 may terminate at the core network. Additionally or alternatively, an anchor network node 110 may connect to one or more devices of the core network that provide a core access and mobility management function (AMF). An IAB network also generally includes multiple non-anchor network nodes 110, which may also be referred to as relay network nodes or simply as IAB nodes (or "IAB-nodes"). Each non-anchor network node 110 may communicate directly with the anchor network node 110 via a wireless backhaul link to access the core network, or may communicate indirectly with the anchor network node 110 via one or more other non-anchor network nodes 110 and associated wireless backhaul links that form a backhaul path to the core network. Some anchor network node 110 or other non-anchor network node 110 may also communicate directly with one or more UEs 120 via wireless access links that carry access traffic. In some examples, network resources for wireless communication (such as time resources, frequency resources, and/or spatial resources) may be shared between access links and backhaul links.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a "multi-hop network." In the example shown in FIG. 1, the network node 110d (for example, a relay network node) may communicate with the network node 110a (for example, a macro network node) and the UE 120d in order to facilitate communication between the network node 110a and the UE 120d. Additionally or alternatively, a UE 120 may be or may operate as a relay station that can relay transmissions to or from other UEs 120. A UE 120 that relays communications may be referred to as a UE relay or a relay UE, among other examples.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an XR device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 and/or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) UEs, evolved or enhanced machine-type communication (eMTC), UEs, further enhanced eMTC (feMTC) UEs, or enhanced feMTC (efeMTC) UEs, or further evolutions thereof, all of which may be simply referred to as "MTC UEs"). An MTC UE may be, may include, or may be included in or coupled with a robot, an uncrewed aerial vehicle, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication network 100).

Some UEs 120 may be classified according to different categories in association with different complexities and/or different capabilities. UEs 120 in a first category may facilitate massive IoT in the wireless communication network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of URLLC, enhanced mobile broadband (eMBB), and/or precise positioning in the wireless communication network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between the capability and complexity of NB-IoT devices and/or eMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, two or more UEs 120 (for example, shown as UE 120a and UE 120e) may communicate directly with one another using sidelink communications (for example, without communicating by way of a network node 110 as an intermediary). As an example, the UE 120a may directly transmit data, control information, or other signaling as a sidelink communication to the UE 120e. This is in contrast to, for example, the UE 120a first transmitting data in an UL communication to a network node 110, which then transmits the data to the UE 120e in a DL communication.

In various examples, the UEs 120 may transmit and receive sidelink communications using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 110 may schedule and/or allocate resources for sidelink communications between UEs 120 in the wireless communication network 100. In some other deployments and configurations, a UE 120 (instead of a network node 110) may perform, or collaborate or negotiate with one or more other UEs to perform, scheduling operations, resource selection operations, and/or other operations for sidelink communications.

In various examples, some of the network nodes 110 and the UEs 120 of the wireless communication network 100 may be configured for full-duplex operation in addition to half-duplex operation. A network node 110 or a UE 120 operating in a half-duplex mode may perform only one of transmission or reception during particular time resources, such as during particular slots, symbols, or other time periods. Half-duplex operation may involve time-division duplexing (TDD), in which DL transmissions of the network node 110 and UL transmissions of the UE 120 do not occur in the same time resources (that is, the transmissions do not overlap in time). In contrast, a network node 110 or a UE 120 operating in a full-duplex mode can transmit and receive communications concurrently (for example, in the same time resources). By operating in a full-duplex mode, network nodes 110 and/or UEs 120 may generally increase the capacity of the network and the radio access link. In some examples, full-duplex operation may involve frequency-division duplexing (FDD), in which DL transmissions of the network node 110 are performed in a first frequency band or on a first component carrier and transmissions of the UE 120 are performed in a second frequency band or on a second component carrier different than the first frequency band or the first component carrier, respectively. In some examples, full-duplex operation may be enabled for a UE 120 but not for a network node 110. For example, a UE 120 may simultaneously transmit an UL transmission to a first network node 110 and receive a DL transmission from a second network node 110 in the same time resources. In some other examples, full-duplex operation may be enabled for a network node 110 but not for a UE 120. For example, a network node 110 may simultaneously transmit a DL transmission to a first UE 120 and receive an UL transmission from a second UE 120 in the same time resources. In some other examples, full-duplex operation may be enabled for both a network node 110 and a UE 120.

In some examples, the UEs 120 and the network nodes 110 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some RATs may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT).

In some aspects, the UE 120 may include a communication manager 140. As described in more detail elsewhere herein, the communication manager 140 may transmit one or more indications. At least one of the one or more indications may indicate one or more of a spatial direction or a latency associated with switching the spatial direction. The communication manager 140 may receive a configuration and transmit or receive a communication in accordance with the configuration and the one or more indications.

In some aspects, the communication manager 140 may transmit, to network node, an indication for support of a mechanical state associated with a reference signal; receive, from the network node, a configuration to apply the mechanical state; and transmit or receive a communication in accordance with the configuration. Additionally, or alternatively, the communication manager 140 may perform one or more other operations described herein.

In some aspects, the network node 110 may include a communication manager 150. As described in more detail elsewhere herein, the communication manager 150 may transmit, to a second network node, an indication for support of a mechanical state associated with a reference signal; receive, from the second network node, a configuration to apply the mechanical state; and transmit or receive a communication in accordance with the configuration. Additionally, or alternatively, the communication manager 150 may perform one or more other operations described herein.

As indicated above, FIG. 1 is provided as an example. Other examples may differ from what is described with regard to FIG. 1.

Figure 2:
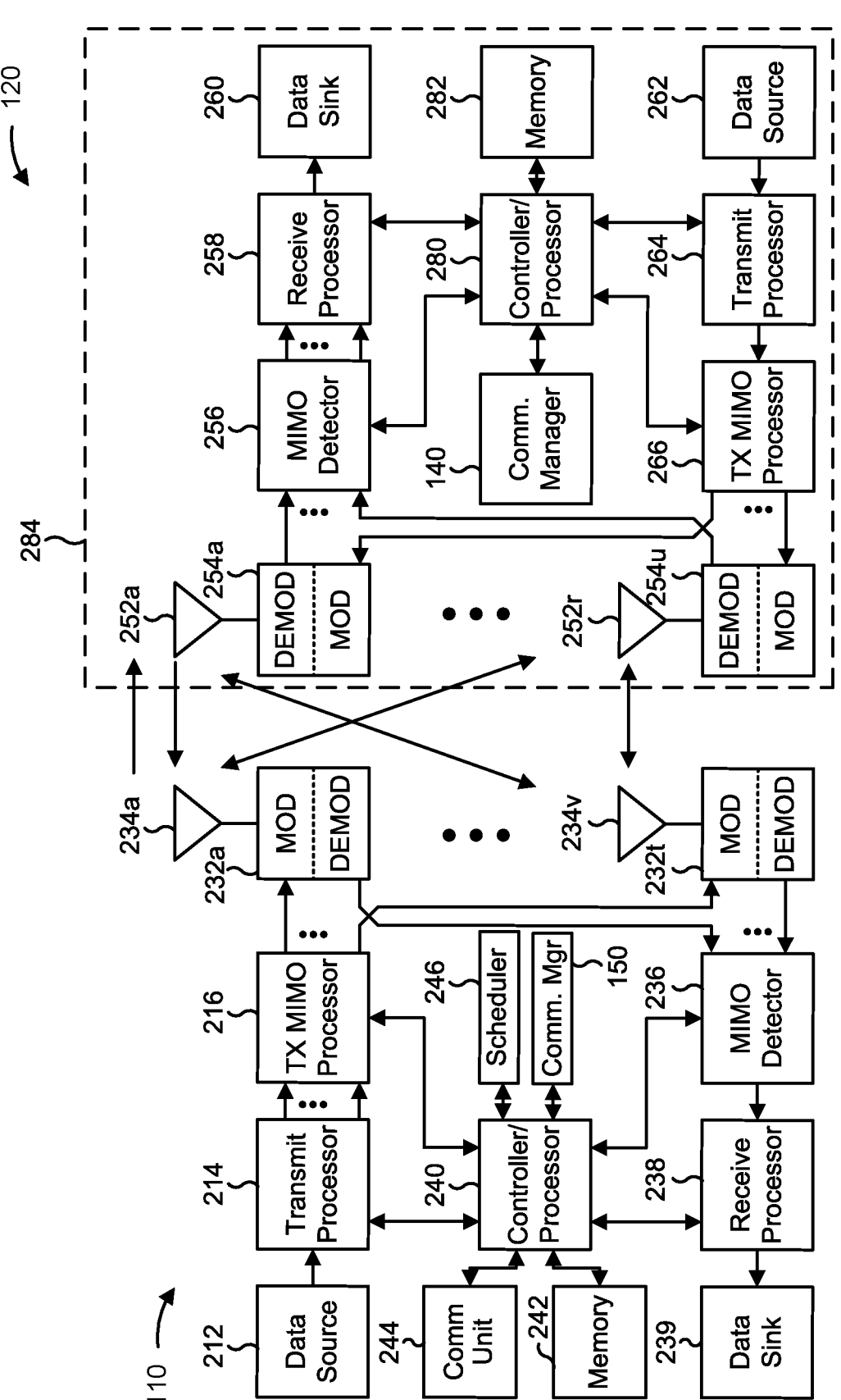
FIG. 2 is a diagram illustrating an example network node in communication with an example user equipment (UE) in a wireless network in accordance with the present disclosure.

FIG. 2 is a diagram illustrating an example network node 110 in communication with an example UE 120 in a wireless network in accordance with the present disclosure.

As shown in FIG. 2, the network node 110 may include a data source 212, a transmit processor 214, a transmit (TX) MIMO processor 216, a set of modems 232 (shown as 232a through 232t, where t≥1), a set of antennas 234 (shown as 234a through 234v, where v≥1), a MIMO detector 236, a receive processor 238, a data sink 239, a controller/processor 240, a memory 242, a communication unit 244, a scheduler 246, and/or a communication manager 150, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 110. The transceiver may be under control of and used by one or more processors, such as the controller/processor 240, and in some aspects in conjunction with processor-readable code stored in the memory 242, to perform aspects of the methods, processes, and/or operations described herein. In some aspects, the network node 110 may include one or more interfaces, communication components, and/or other components that facilitate communication with the UE 120 or another network node.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

For downlink communication from the network node 110 to the UE 120, the transmit processor 214 may receive data ("downlink data") intended for the UE 120 (or a set of UEs that includes the UE 120) from the data source 212 (such as a data pipeline or a data queue). In some examples, the transmit processor 214 may select one or more MCSs for the UE 120 in accordance with one or more channel quality indicators (CQIs) received from the UE 120. The network node 110 may process the data (for example, including encoding the data) for transmission to the UE 120 on a downlink in accordance with the MCS(s) selected for the UE 120 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing (OFDM)) to obtain an output sample stream. Each modem 232 may further use the respective modulator component to process (for example, convert to analog, amplify, filter, and/or upconvert) the output sample stream to obtain a time domain downlink signal. The modems 232a through 232t may together transmit a set of downlink signals (for example, T downlink signals) via the corresponding set of antennas 234.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 120 to the network node 110, uplink signals from the UE 120 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 110 may use the scheduler 246 to schedule one or more UEs 120 for downlink or uplink communications. In some aspects, the scheduler 246 may use DCI to dynamically schedule DL transmissions to the UE 120 and/or UL transmissions from the UE 120. In some examples, the scheduler 246 may allocate recurring time domain resources and/or frequency domain resources that the UE 120 may use to transmit and/or receive communications using an RRC configuration (for example, a semi-static configuration), for example, to perform semi-persistent scheduling (SPS) or to configure a configured grant (CG) for the UE 120.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the network node 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 may include a set of antennas 252 (shown as antennas 252a through 252r, where r≥1), a set of modems 254 (shown as modems 254a through 254u, where u≥1), a MIMO detector 256, a receive processor 258, a data sink 260, a data source 262, a transmit processor 264, a TX MIMO processor 266, a controller/processor 280, a memory 282, and/or a communication manager 140, among other examples. One or more of the components of the UE 120 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 120. The transceiver may be under control of and used by one or more processors, such as the controller/processor 280, and in some aspects in conjunction with processor-readable code stored in the memory 282, to perform aspects of the methods, processes, or operations described herein. In some aspects, the UE 120 may include another interface, another communication component, and/or another component that facilitates communication with the network node 110 and/or another UE 120.

For downlink communication from the network node 110 to the UE 120, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 to the data sink 260 (which may include a data pipeline, a data queue, and/or an application executed on the UE 120), and may provide decoded control information and system information to the controller/processor 280.

For uplink communication from the UE 120 to the network node 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 110 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 by the network node 110.

The transmit processor 264 may generate reference symbols for one or more reference signals, such as an uplink DMRS, an uplink sounding reference signal (SRS), and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254a through 254u may transmit a set of uplink signals (for example, R uplink signals or U uplink symbols) via the corresponding set of antennas 252. An uplink signal may include a UCI communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more uEs 120) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different uEs 120 or network nodes 110 may include different numbers of antenna elements. For example, a UE 120 may include a single antenna element, two antenna elements, four antenna elements, eight antenna elements, or a different number of antenna elements. As another example, a network node 110 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor

258, and/or the TX MIMO processor 266 may be performed by or under the control of the controller/processor 280.

Figure 3:
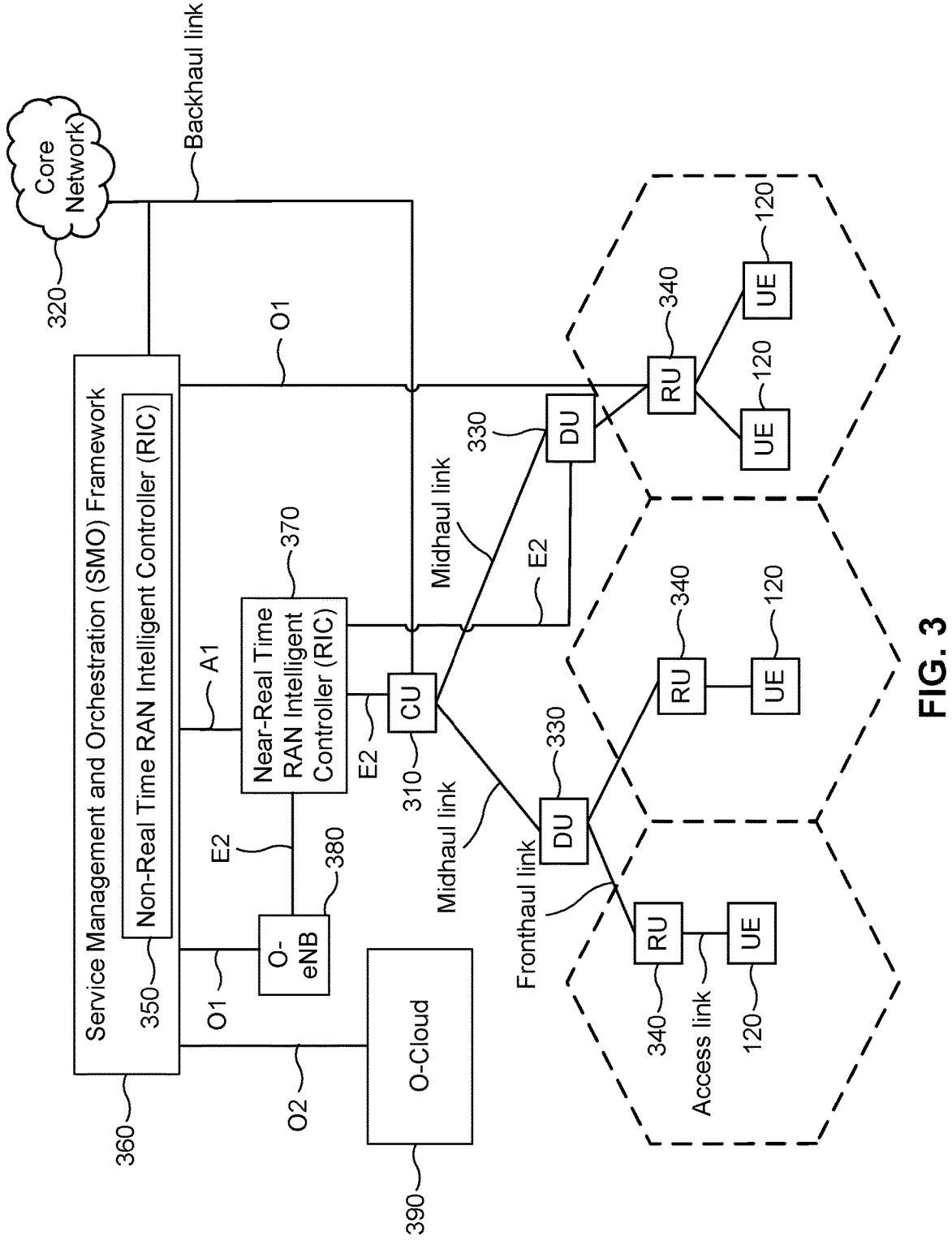
FIG. 3 is a diagram illustrating an example disaggregated base station architecture in accordance with the present disclosure.

FIG. 3 is a diagram illustrating an example disaggregated base station architecture 300 in accordance with the present disclosure. One or more components of the example disaggregated base station architecture 300 may be, may include, or may be included in one or more network nodes (such one or more network nodes 110). The disaggregated base station architecture 300 may include a CU 310 that can communicate directly with a core network 320 via a backhaul link, or that can communicate indirectly with the core network 320 via one or more disaggregated control units, such as a Non-RT RIC 350 associated with a Service Management and Orchestration (SMO) Framework 360 and/or a Near-RT RIC 370 (for example, via an E2 link). The CU 310 may communicate with one or more DUs 330 via respective midhaul links, such as via F1 interfaces. Each of the DUs 330 may communicate with one or more RUs 340 via respective fronthaul links. Each of the RUs 340 may communicate with one or more uEs 120 via respective RF access links. In some deployments, a UE 120 may be simultaneously served by multiple RUs 340.

Each of the components of the disaggregated base station architecture 300, including the CUS 310, the DUs 330, the RUs 340, the Near-RT RICs 370, the Non-RT RICs 350, and the SMO Framework 360, may include one or more interfaces or may be coupled with one or more interfaces for receiving or transmitting signals, such as data or information, via a wired or wireless transmission medium.

In some aspects, the CU 310 may be logically split into one or more CU user plane (CU-UP) units and one or more CU control plane (CU-CP) units. A CU-UP unit may communicate bidirectionally with a CU-CP unit via an interface, such as the E1 interface when implemented in an O-RAN configuration. The CU 310 may be deployed to communicate with one or more DUs 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 360 may support RAN deployment and provisioning of non-virtualized and virtualized network elements. For non-virtualized network elements, the SMO Framework 360 may support the deployment of dedicated physical resources for RAN coverage requirements, which may be managed via an operations and maintenance interface, such as an O1 interface. For virtualized network elements, the SMO Framework 360 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 350, and/or a Near-RT RIC 370. In some aspects, the SMO Framework 360 may communicate with a hardware aspect of a 4G RAN, a 5G NR RAN, and/or a 6G RAN, such as an open eNB (O-eNB) 380, via an O1 interface. Additionally or alternatively, the SMO Framework 360 may communicate directly with each of one or more RUs 340 via a respective O1 interface. In some deployments, this configuration can enable each DU 330 and the CU 310 to be implemented in a cloud-based RAN architecture, such as a vRAN architecture.

The Non-RT RIC 350 may include or may implement a logical function that enables non-real-time control and optimization of RAN elements and resources, AI/ML workflows including model training and updates, and/or policy-based guidance of applications and/or features in the Near-RT RIC 370. The Non-RT RIC 350 may be coupled to or may communicate with (such as via an A1 interface) the Near-RT RIC 370. The Near-RT RIC 370 may include or may implement a logical function that enables near-real-time control and optimization of RAN elements and resources via data collection and actions via an interface (such as via an E2 interface) connecting one or more CUs 310, one or more DUs 330, and/or an O-eNB with the Near-RT RIC 370.

In some aspects, to generate AI/ML models to be deployed in the Near-RT RIC 370, the Non-RT RIC 350 may receive parameters or external enrichment information from external servers. Such information may be utilized by the Near-RT RIC 370 and may be received at the SMO Framework 360 or the Non-RT RIC 350 from non-network data sources or from network functions. In some examples, the Non-RT RIC 350 or the Near-RT RIC 370 may tune RAN behavior or performance. For example, the Non-RT RIC 350 may monitor long-term trends and patterns for performance and may employ AI/ML models to perform corrective actions via the SMO Framework 360 (such as reconfiguration via an O1 interface) or via creation of RAN management policies (such as A1 interface policies).

As indicated above, FIG. 3 is provided as an example. Other examples may differ from what is described with regard to FIG. 3.

The network node 110, the controller/processor 240 of the network node 110, the UE 120, the controller/processor 280 of the UE 120, the CU 310, the DU 330, the RU 340, or any other component(s) of FIG. 1, 2, or 3 may implement one or more techniques or perform one or more operations associated with mechanical state configurations, as described in more detail elsewhere herein. For example, the controller/processor 240 of the network node 110, the controller/processor 280 of the UE 120, any other component(s) of FIG. 2, the CU 310, the DU 330, or the RU 340 may perform or direct operations of, for example, process 800 of FIG. 8, process 900 of FIG. 9, process 1000 of FIG. 10, or other processes as described herein (alone or in conjunction with one or more other processors). The memory 242 may store data and program codes for the network node 110, the network node 110, the CU 310, the DU 330, or the RU 340. The memory 282 may store data and program codes for the UE 120. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 110, the UE 120, the CU 310, the DU 330, or the RU 340, may cause the one or more processors to perform process 800 of FIG. 8, process 900 of FIG. 9, process 1000 of FIG. 10, or other processes as described herein. In some examples, executing instructions may include running the instructions, converting the instructions, compiling the instructions, and/ or interpreting the instructions, among other examples.

In some aspects, the UE 120 includes means for transmitting one or more indications, wherein at least one of the one or more indications indicates a latency associated with switching a spatial direction of an antenna; means for receiving a configuration; and/or means for transmitting or receiving a communication in accordance with the configuration and the one or more indications.

In some aspects, the UE 120 includes means for transmitting, to a network node (e.g., network node 110), an indication for support of a mechanical state associated with a reference signal; means for receiving, from the network node, a configuration to apply the mechanical state; and/or means for transmitting or receiving a communication in accordance with the configuration. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 (e.g., a first network node) includes means for transmitting, to a second network node, an indication for support of a mechanical state associated with a reference signal; means for receiving, from the second network node, a configuration to apply the mechanical state; and/or means for transmitting or receiving a communication in accordance with the configuration. The means for the network node 110 to perform operations described herein may include, for example, one or more of communication manager 150, transmit processor 214, TX MIMO processor 216, modem 232, antenna 234, MIMO detector 236, receive processor 238, controller/processor 240, memory 242, or scheduler 246.

As indicated above, FIG. 3 is provided as an example. Other examples may differ from what is described with regard to FIG. 3.

Figure 4:
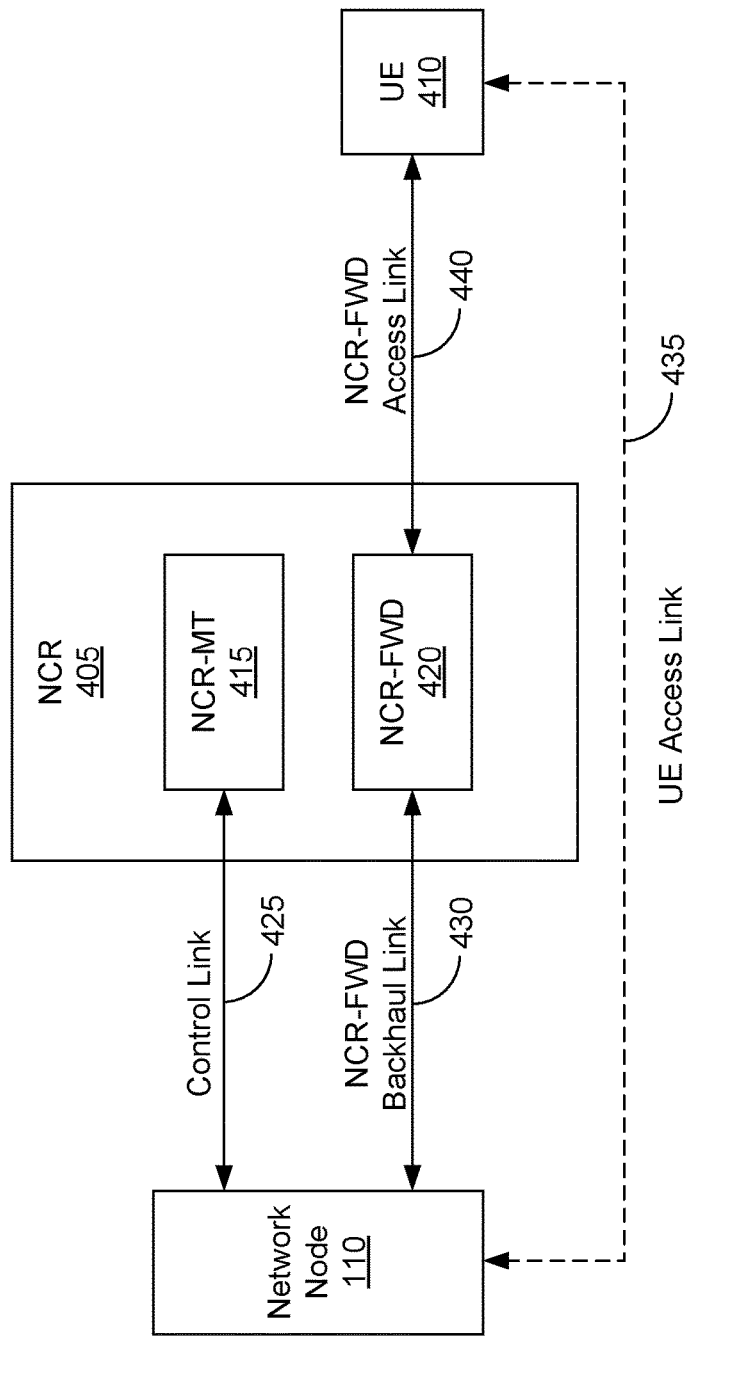
FIG. 4 is a diagram illustrating an example associated with network-controlled repeaters (NCRs), in accordance with the present disclosure.

FIG. 4 is a diagram illustrating an example 400 associated with NCRs, in accordance with the present disclosure. As shown in FIG. 4, example 400 includes communication between a network node 110, an NCR 405, and a UE 410 (such as UE 120). In some aspects, the network node 110, the UE 410, and the NCR 405 may be included in a wireless network, such as wireless network 100. The network node 110 and UE 410 may communicate via a wireless access link (shown as UE access link 435 in FIG. 4), which may include an uplink and a downlink.

The NCR 405 may be configured to extend the coverage of the network by repeating signals between the network node 110 and UE 410. The NCR 405 may include an NCR-MT 415 (which may be a UE 120 different from the UE 410) for communicating with the network node 110. The NCR-MT 415 may include hardware for receiving, interpreting, and generating control signals. The NCR-MT 415 may further include components for interfacing with the NCR-FWD 420, which may be configured to receive, amplify, and forward RF signals between the network node 110 and the UE 410. The NCR-FWD 420 may include one or more RF amplifiers, filters, and antennas designed to improve or maintain signal integrity and reduce interference.

Signals may be transmitted between the network node 110 and the NCR-MT 405 via a control link 425 (also called a C-link). The control link 425 may facilitate the exchange of control information between the network node 110 and the NCR-MT 405, which may enable the network to manage the operations of the NCR 405, including operations of the NCR-MT 415 and/or the NCR-FWD, among other examples. The control link 425 may be based on the Uu interface. A backhaul link 430 may allow the network node 110 and the NCR-FWD 420 to exchange communications, such as data traffic to be repeated by the NCR 405. An access link may allow the UE 410 to communicate with the network via the NCR 405. For example, the NCR-FWD access link 440 may allow the UE 410 to transmit signals to, and receive signals from, the NCR-FWD 420. Accordingly, the NCR-FWD access link 440 may allow uplink and/or downlink communications between the UE 410 and the network node 110. In some aspects, the UE access link 435 may allow the UE 410 and network node 110 to communicate directly by, for example, bypassing the NCR 405.

In some aspects, the NCR 405 may extend RF coverage for, for example, the FR1 and/or FR2 frequency bands, among other examples. In some aspects, the NCR 405 may operate in a single hop stationary mode. For example, the NCR 405 may be positioned in a fixed location (e.g., stationary), and only one NCR may be used for the communications between the UE 410 and a particular network node (single hop). In some aspects, the NCR 405 is transparent to the UE 410. For example, the UE 410 may not be aware of the NCR 405 or that the uplink downlink signals received via the NCR-FWD access link 440 were provided via the NCR 405. In some aspects, the network may maintain the links between the network node 110 and NCR 405 (e.g., the control link 425 and the backhaul link 430) and the links between the UE 410 and the NCR 405 (e.g., the NCR-FWD access link 440) simultaneously.

As indicated above, FIG. 4 is provided as an example. Other examples may differ from what is described with respect to FIG. 4.

Figure 5:
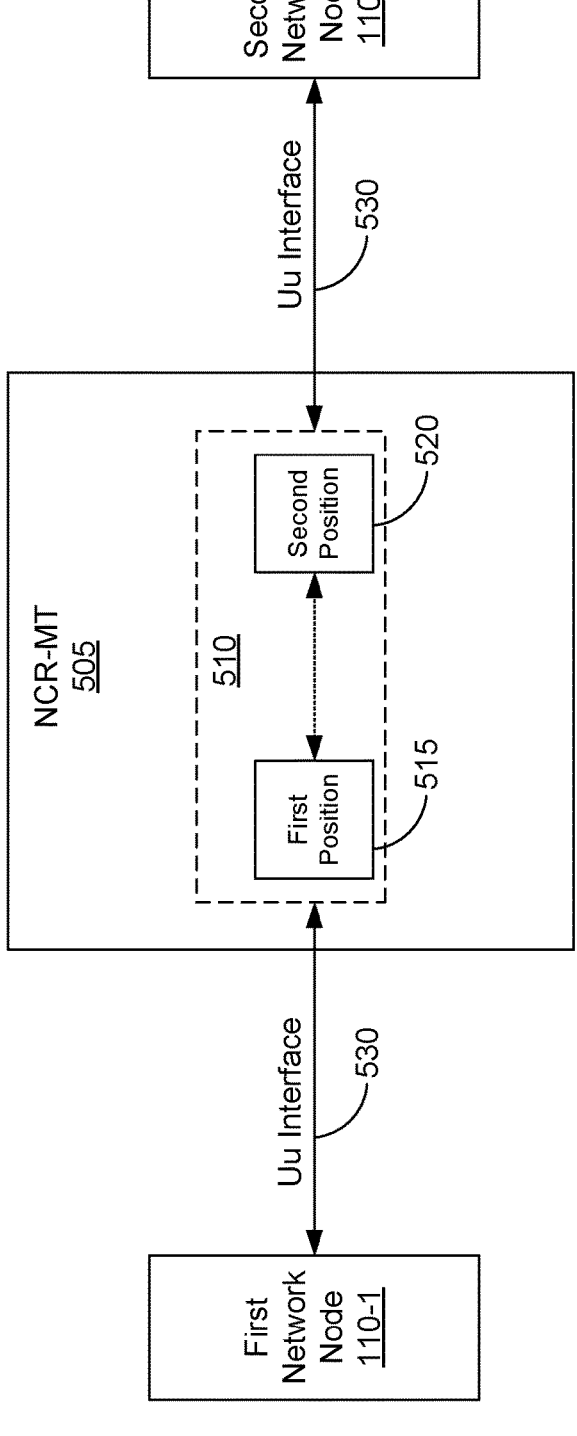
FIG. 5 is a diagram illustrating an example associated with an NCR-mobile termination (NCR-MT) with an antenna that moves between a first position and a second position, in accordance with the present disclosure.

FIG. 5 is a diagram illustrating an example 500 associated with an NCR-MT with an antenna that moves between a first position and a second position, in accordance with the present disclosure. As shown in FIG. 5, example 500 includes communication between a first network 110-1, a second network node 110-2, and an NCR-MT 505 (e.g., NCR-MT 415). In some aspects, the first network node 110-1, the second network node 110-2, and the NCR-MT 505 may be included in a wireless network, such as wireless network 100, and may communicate via a Uu interface 530. In some aspects, the NCR-MT 505 is a type of UE 120.

In some aspects, the NCR-MT 505 may use mechanical beam steering for communications with the first network node 110-1 and the second network node 110-2. For example, the NCR-MT 505 may include an antenna 510 that can be physically repositioned to change a direction of a beam so the NCR-MT 505 can communicate with both the first network node 110-1 and the second network node 110-2 from a fixed location and without relying on multiple antenna apertures.

Without additional indications or configurations, mechanically switching the direction of the antenna 510, however, may introduce network performance issues. For example, the NCR-MT 505 may perform a measurement using communications with a first network node 110-1 when the antenna is in a first mechanical state (e.g., a first position 515). Using the same measurements for communications with the second network node 110-2 when the antenna is in a second mechanical state (e.g., a second position 520) could introduce unexpected latency or other issues that may negatively impact network performance for communications between the NCR-MT 505 and the second network node 110-2. Beyond the different beams used by the antenna 510 when communicating from the first position 515 and communicating from the second position 520, the NCR-MT 505 may need to account for the time needed to move the antenna 510 between the first position 515 and the second position 520 or risk degraded network performance. For example, in one scenario, if the antenna 510 is in the first position 515 for physical downlink control channel (PDCCH) communications and is to be in the second position 520 for physical downlink shared channel (PDSCH) communications, the latency to schedule the PDSCH may depend on the time needed for the NCR-MT 505 to move the antenna 510 from the first position 515 to the second position 520. Similar compensations may be needed to account for changes in a measurement gap, whether a mechanical beam switch incurs a small or large latency, changes in resource beam partitioning (e.g., repeater patterns), changes in a supervision timer for a handover to another network node, changes to an angular direction of a DU or gNB cell (e.g., a gNB cell incorporated into a unmanned aerial vehicle), and/or a combination thereof, among other examples. Accordingly, as discussed in greater detail below, the NCR-MT 505 may be configured to compensate for issues that may arise when the antenna is moved from a first position to a second position.

As indicated above, FIG. 5 is provided as an example. Other examples may differ from what is described with respect to FIG. 5.

Figure 6:
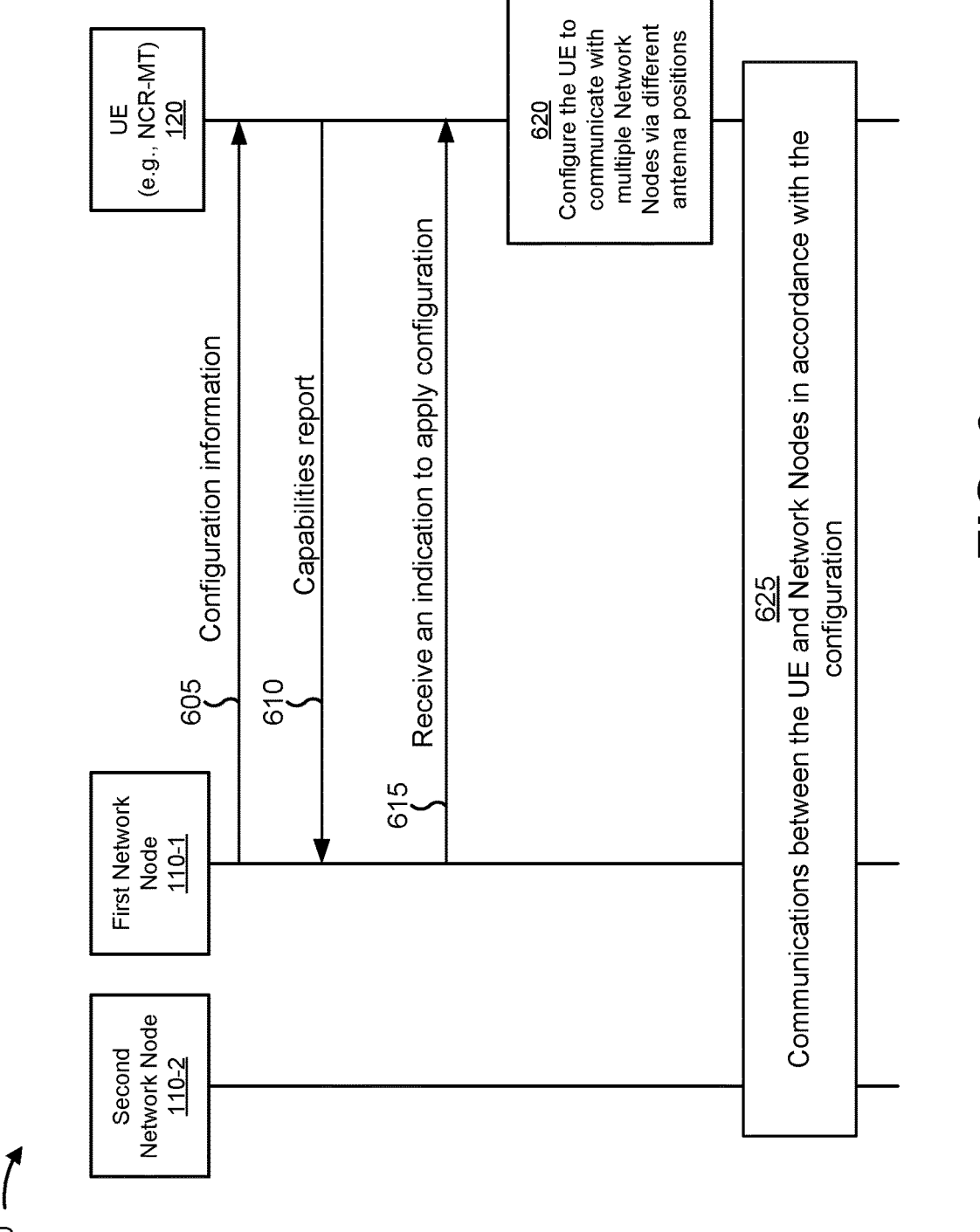
FIG. 6 is a diagram of an example associated with configuring an NCR-MT to communicate with a movable antenna, in accordance with the present disclosure.

FIG. 6 is a diagram of an example 600 associated with configuring an NCR-MT to communicate with a movable antenna, in accordance with the present disclosure. As shown in FIG. 6, a first network node 110-1 (e.g., network node 110, a CU, a DU, and/or an RU) and a second network node 110-2 may communicate with a UE 120 (e.g., UE 120, NCR 405, NCR-MT 415, NCR-MT 505, an IAB node, and/or a combination thereof, among other examples). In some aspects, the first network node 110-1, the second network node 110-2, and the UE 120 may be part of a wireless network (e.g., wireless network 100). The UE 120 and the network nodes 110-1, 110-2 may have established a wireless connection prior to operations shown in FIG. 6.

As shown by reference number 605, the first network node 110-1 may transmit, and the UE 120 may receive, configuration information. In some aspects, the UE 120 may receive the configuration information via one or more of system information (e.g., a master information block (MIB) and/or a system information block (SIB), among other examples), RRC signaling, one or more MAC-CEs, and/or DCI, among other examples.

In some aspects, the configuration information may indicate one or more candidate configurations and/or communication parameters. In some aspects, the one or more candidate configurations and/or communication parameters may be selected, activated, and/or deactivated by a subsequent indication. For example, the subsequent indication may select a candidate configuration and/or communication parameter from the one or more candidate configurations and/or communication parameters. In some aspects, the subsequent indication (e.g., an indication described herein) may include a dynamic indication, such as one or more MAC CEs and/or one or more DCI messages, among other examples.

In some aspects, the configuration information may indicate how the UE 120 is to communicate with the network nodes 110-1, 110-2 based on a mechanical state (e.g., a first state or a second state), each associated with a spatial direction (e.g., angle and/or position) of an antenna of the UE 120 and/or a communication direction (e.g., uplink communication, downlink communication, sidelink communication, transmitting to a first network device, receiving from the first network device, transmitting to a second network device, receiving from the second network device, and/or a combination thereof, among other examples). The UE 120 may configure itself based at least in part on the configuration information. In some aspects, the UE 120 may be configured to perform one or more operations described herein based at least in part on the configuration information.

As shown by reference number 610, the UE 120 may transmit, and the first network node 110-1 may receive, a capabilities report. The capabilities report may indicate whether the UE 120 supports a feature and/or one or more parameters related to the feature. For example, the capabilities report may indicate a capability and/or parameter for transmitting and/or receiving communications in accordance with whether the antenna is in a first mechanical state (e.g., the first position for communicating with the first network node 110-1) or a second mechanical state (e.g., the second position for communicating with the second network node 110-2). As another example, the capabilities report may indicate a capability and/or parameter for indicating, to the first network node 110-1, the second network node 110-2, or both, that the UE 120 supports operating in multiple mechanical states (e.g., multiple positions of the antenna) associated with a reference signal. One or more operations described herein may be based on capability information of the capabilities report. For example, the UE 120 may perform a communication in accordance with the capability information, or may receive configuration information that is in accordance with the capability information.

In some aspects, the capabilities report may indicate UE 120 support for transmitting one or more indications indicating a spatial direction, a latency associated with switching the spatial direction, and/or a combination thereof, among other examples. The communication direction may refer to an uplink communication, a downlink communication, a sidelink communication, a communication between network devices (e.g., transmitting signals or messages to a network device and/or receiving signals or messages from the same or a different network device), and/or a combination thereof, among other examples. The capabilities report may further indicate UE 120 support for receiving a configuration and transmitting or receiving a communication in accordance with the configuration and the one or more indications. For example, in some aspects, the capabilities report may indicate UE 120 support for transmitting a first indication of one or more of a plurality of mechanical states, receiving a configuration, receiving a second indication that associates the configuration to one or more of the first state or the second state, and transmitting or receiving a communication in accordance with the configuration and one or more of the first state or the second state as indicated by the second indication. The mechanical states, including the first state and the second state, may refer to spatial directions (e.g., angles and/or positions) of an antenna of the UE 120. Accordingly, when in different mechanical states, the antenna may point in different spatial directions. For example, the antenna in the first state may have a different angle and/or position relative to the antenna in the second state. In some aspects, each of the first state and the second state are associated with a communication direction. For example, the antenna may be in the first state for communications in one communication direction (e.g., uplink communications) and in the second state for communications in another communication direction (e.g., downlink communications). Therefore, the communication direction may be associated with the spatial direction of the antenna. Alternatively, in some aspects, the antenna may be in the same state (e.g., the first state) for multiple communication directions. For example, the antenna may be in the first state for both uplink and downlink communications. In some aspects, a single indication may indicate both the spatial direction and the latency associated with switching the spatial direction. For example, the latency indicated by the single indication may tell the first network node 110-1 that the UE 120 is switching the spatial direction by mechanically moving the antenna.

In some aspects, the capabilities report may indicate UE 120 support for transmitting, to the first network node 110-1, the second network node 110-2, or both, an indication (e.g., the first indication) supporting a mechanical state associated with a reference signal; receiving, from the first network node 110-1, the second network node 110-2, or both, a configuration to apply the mechanical state; and transmitting or receiving a communication in accordance with the configuration.

In some aspects, the first indication may include one or more of a count of the number of mechanical states of the UE 120, a spatial direction (e.g., angle and/or position) associated with the first state, a spatial direction associated with the second state, an association (e.g., a quasi-co-location (QCL) relationship) between the first state or the second state and an indication of a reference signal (e.g., a synchronization signal block (SSB), CSI-RS, a transmission configuration indicator (TCI) state, a positioning reference signal (PRS), a tracking reference signal (TRS), and/or a combination thereof, among other examples) or group of reference signals of the first network node 110-1, a cell served by the first network node 110-1, a neighboring cell (e.g., the second network node 110-2), a cell served by the neighboring cell, and/or a combination thereof, among other examples. In some aspects, the first indication may include or otherwise indicate (e.g., implicitly indicate via an indicated spatial direction, communication direction, or indicated mechanical state) a latency value. The latency value may be associated with a latency for switching between the first position (e.g., the antenna of the UE 120 being in a first state and pointed in a first direction) and the second position (e.g., the antenna of the UE 120 being in a second state and pointed in a second direction). In some aspects, the latency value may be associated with switching direction of communication from a first direction to a second direction with the first state (e.g., changing the beam direction without moving the antenna to a different position). In some aspects, the first indication may include a pattern of states, including the first state and the second state. The pattern may include a time and/or periodicity for each of the first state and the second state. In some aspects, the first indication may include capability signaling (e.g., indicating a capability of the UE 120, as discussed above), a measurement report (e.g., associating reference signals to one or more of the multiple states, as discussed above), UE assistance information (e.g., as queried by the network), and/or a combination thereof, among other examples. In some aspects, the first indication may be specific to downlink communications, uplink communications, sidelink communications, and/or a combination thereof, among other examples. The first indication may be transmitted to the first network node 110-1 and/or the second network node 110-2 via RRC, MAC-CE, or DCI, and/or a combination thereof, among other examples.

In some aspects, the configuration information described in connection with reference number 605 and/or the capabilities report may include information transmitted via multiple communications. Additionally, or alternatively, the first network node 110-1 may transmit the configuration information, or a communication including at least a portion of the configuration information, before and/or after the UE 120 transmits the capabilities report. For example, the first network node 110-1 may transmit a first portion of the configuration information before the capabilities report, the UE 120 may transmit at least a portion of the capabilities report, and the first network node 110-1 may transmit a second portion of the configuration information after receiving the capabilities report.

As shown by reference number 615, the UE 120 may receive, and the first network node 110-1 may transmit, an indication (e.g., a second indication) to apply the configuration. Applying the configuration may allow the UE 120 to communicate with the first network node 110-1 when an antenna of the UE 120 is in a first mechanical state (e.g., the first position) and the second network node 110-2 when the antenna of the UE 120 is in a second mechanical state (e.g., the second position).

As shown by reference number 620, the UE 120 may configure itself, based at least in part on receiving the indication described in connection with reference number 615. For example, the UE 120 may configure itself in accordance with the second indication, which may indicate to the UE 120 that the configuration is associated with the first state or the second state. In some aspects, the configuration may include a measurement gap configuration, a reference signal measurement configuration, a scheduling grant, a resource configuration, a timer configuration, a network node configuration, or an instruction to switch to a resource.

The measurement gap configuration may configure the UE 120 with one or more rules for applying an extended and/or additional gap configuration in accordance with the first indication (e.g., the indication for support for multiple states).

The reference signal measurement configuration may configure the UE 120 with one or more rules for the UE 120 to receive a first measurement object for the first state and a second measurement object for the second state. In some aspects, the reference signal measurement configuration may include one or more rules for the UE 120 to receive, for the first state, a first list of cells to be measured, receive a first priority for measuring cells, receive a first list of cells not to be measured, and/or a combination thereof, among other examples. In some aspects, the reference signal measurement configuration may include one or more rules for the UE 120 to receive, for the second state, a second list of cells to be measured, receive a second priority for measuring cells, receive a second list of cells not to be measured, and/or a combination thereof, among other examples. The reference signals associated with the reference signal measurement configuration may include an SSB, a CSI-RS, a TRS, a PRS, and/or a combination thereof, among other examples.

The scheduling grant may configure the UE 120 with one or more rules for receiving a PDCCH with a first beam associated with the first state. The PDCCH may provide a grant associated with reception of the PDSCH (or transmission of a PUSCH) using a second beam. The scheduling grant may be associated with a first scheduling latency, a first modulation coding scheme (MCS), and/or a first Tx power if the second beam is associated with the first state. The grant may be associated with a second scheduling latency, a second MCS, and/or a second TX power if the second beam is associated with the second state.

The resource configuration may configure the UE 120 with one or more rules for partitioning communication resources across the first state and the second state. In some aspects, the partitioning may be periodic.

The timer configuration may configure the UE 120 with a supervision timer value of a handover in accordance with whether the UE 120 is attempting to communicate with the first network node 110-1 or the second network node 110-2 (e.g., whether the UE 120 is attempting to communicate in accordance with the first state or the second state).

The network node configuration (e.g., a TRP, cell, or cell group configuration) may configure the UE 120 with one or more rules for storing a first serving network configuration associated with the first state and a second network configuration associated with the second state. The UE 120 may be configured to apply one of the first network configuration or the second configuration in accordance with whether the UE 120 is communicating via the first state or the second state, respectively. The switching of the applied network configurations may include activating and/or deactivating one or more TRPs, performing a handover, switching communication to a master cell group (MCG) and/or secondary cell group (SCG), activating or deactivating a serving cell group or SCG, and/or a combination thereof, among other examples.

The instruction to switch to a state on a resource may configure the UE 120 to apply one or more rules for switching to a different state (e.g., from the first state to the second state or from the second state to the first state) on a resource. In some aspects, the resource may be periodic.

As shown by reference number 625, the UE 120 may communicate with the first network node 110-1 and/or the second network node 110-2, in accordance with the configuration. For example, the UE 120 may be configured to move the antenna to the position associated with the mechanical state indicated by the first network node 110-1. Communication may include transmitting signals to, and/or receiving signals from, the first network node 110-1, the second network node 110-2, and/or a combination thereof, among other examples.

As indicated above, FIG. 6 is provided as an example. Other examples may differ from what is described with respect to FIG. 6.

Figure 7:
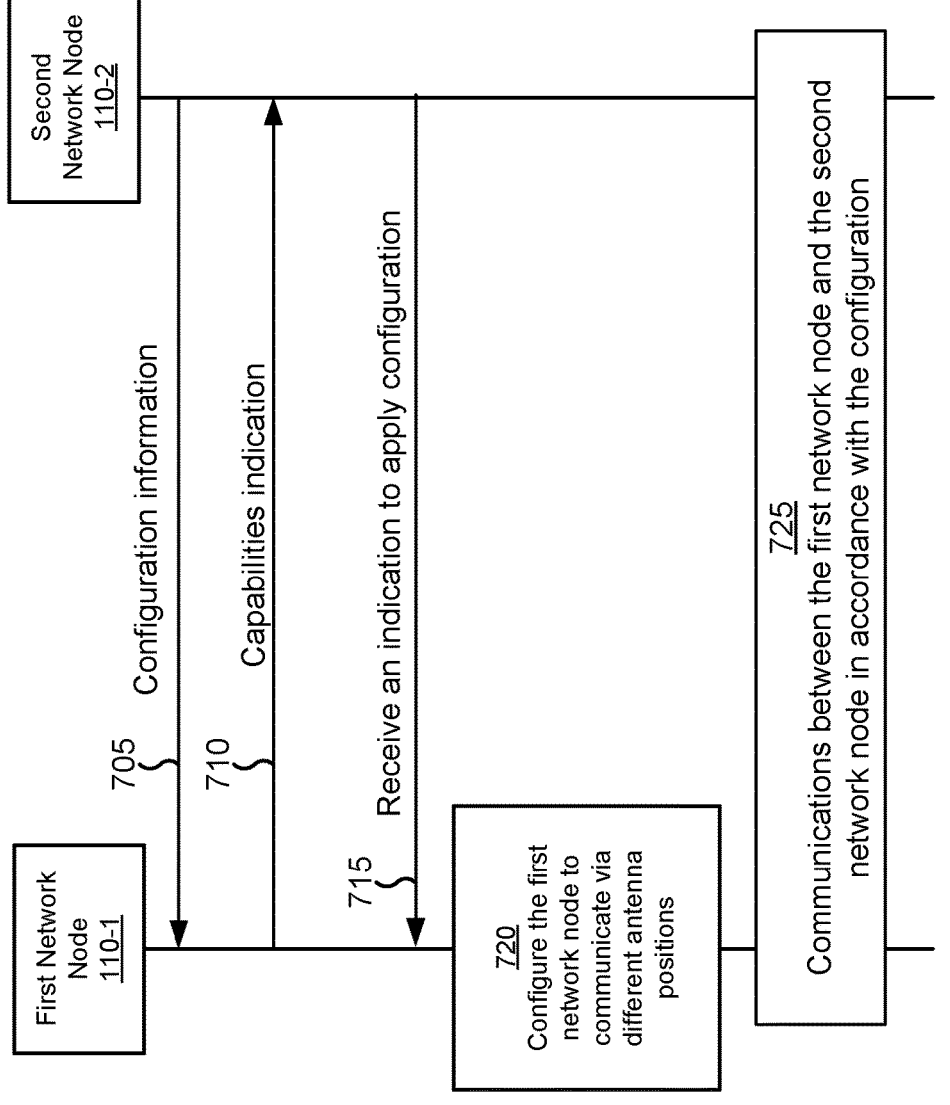
FIG. 7 is a diagram of an example associated with network node support for multiple mechanical states, in accordance with the present disclosure.

FIG. 7 is a diagram of an example 700 associated with network node support for multiple mechanical states, in accordance with the present disclosure. As shown in FIG. 7, a first network node 110-1 (e.g., network node 110, an NCR-MT, a CU, a DU, and/or an RU) may communicate with a second network node 110-2 (e.g., network node 110, a CU, a DU, an RU, and/or a location management function (LMF)). In some aspects, the first network node 110-1 and the second network node 110-2 may be part of a wireless network (e.g., wireless network 100). The first network node 110-1 and the second network node 110-2 may have established a wireless connection prior to operations shown in FIG. 7.

As shown by reference number 705, the second network node 110-2 may transmit, and the first network node 110-1 may receive, configuration information. In some aspects, the configuration information may indicate one or more candidate configurations and/or communication parameters. In some aspects, the one or more candidate configurations and/or communication parameters may be selected, activated, and/or deactivated by a subsequent indication. For example, the subsequent indication may select a candidate configuration and/or communication parameter from the one or more candidate configurations and/or communication parameters. In some aspects, the configuration information may indicate that the first network node 110-1 is to transmit, to the second network node 110-2, an indication for support of a mechanical state associated with a reference signal; receive, from the second network node 110-2, a configuration to apply the mechanical state; and transmit or receive a communication in accordance with the configuration.

The first network node 110-1 may configure itself based at least in part on the configuration information. In some aspects, the first network node 110-1 may be configured to perform one or more operations described herein based at least in part on the configuration information.

As shown by reference number 710, the first network node 110-1 may transmit, and the second network node 110-2 may receive, a capabilities report. The capabilities report may indicate whether the first network node 110-1 supports a feature and/or one or more parameters related to the feature. For example, the capability information may indicate a capability and/or parameter for transmitting or receiving communications in accordance with the configuration. One or more operations described herein may be based on capability information of the capabilities report. For example, the first network node 110-1 may perform a communication in accordance with the capability information, or may receive configuration information that is in accordance with the capability information. In some aspects, the capabilities report may indicate support for the first network node 110-1 to transmit, to the second network node 110-2, an indication for support of a mechanical state associated with a reference signal; receive, from the second network node 110-2, a configuration to apply the mechanical state; and transmit or receive a communication in accordance with the configuration.

In some aspects, the configuration information described in connection with reference number 705 and/or the capabilities report may include information transmitted via multiple communications. Additionally, or alternatively, the second network node 110-2 may transmit the configuration information, or a communication including at least a portion of the configuration information, before and/or after the first network node 110-1 transmits the capabilities report. For example, the second network node 110-2 may transmit a first portion of the configuration information before the capabilities report, the first network node 110-1 may transmit at least a portion of the capabilities report, and the network node may transmit a second portion of the configuration information after receiving the capabilities report.

As shown by reference number 715, the first network node 110-1 may receive, and the second network node 110-2 network node may transmit, an indication to apply the configuration for applying rules for one or more of the multiple mechanical states.

As shown by reference number 720, the first network node 110-1 may configure itself, based at least in part on receiving the indication described in connection with reference number 715 to communicate with the second network node 110-2 in accordance with one or more mechanical states (e.g., different antenna positions). For example, the first network node 110-1 may configure itself to transmit a PRS to the second network node 110-2. In some aspects, the first network node 110-1 may configure itself to receive an SRS from the second network node 110-2. In some aspects, the configuration may include one or more rules for the first network node 110-1 to apply a latency value to communications with the second network node 110-2. In some aspects, the latency value included in the configuration and applied by the first network node 110-1 is based on the mechanical state of the first network node 110-1 (e.g., a position of an antenna of the first network node 110-1).

As shown by reference number 725, the first network node 110-1 may communicate with the second network node 110-2 based at least in part on the configuration. For example, as discussed above, the first network node 110-1 may be configured to transmit a PRS to, and/or or receive an SRS from, the second network node 110-2 in accordance with the configuration.

As indicated above, FIG. 7 is provided as an example. Other examples may differ from what is described with respect to FIG. 7.

In some aspects, the latency discussed above may refer to delays caused by mechanical rotation, delays for following calibration, recalibration, and/or retuning of tracking loops, and/or a combination thereof, among other examples. In instances of calibration or recalibration, the device (e.g., the UE, NCR-MT, TRP, DU, etc.) may not know the latency associated with settling a mechanical rotation. Accordingly, the device may support transmitting a "ready" or acknowledgement (ACK) message to notify other entities when the device is ready for operation in the new state.

The directions and positions of an antenna (e.g., the spatial directions) were discussed above in terms of associated reference signals. An alternative or additional aspect may include linking a mechanical state to a range of angles of the antenna, a field view of the antenna, and/or a combination thereof, among other examples.

In some aspects, the "changing" of the mechanical state may refer generally to an exchange of signaling, particularly with respect to latency associated with beam switching. For example, the network may operate in accordance with the beam direction supported by the device as well as the switching time for different changes in states. The switching time may be a function of a difference in pointing directions, a table corresponding to a specific switching combination, and/or a combination thereof, among other examples. If that information is not exchanged, the network may assume that the device can support electronic-based control (e.g., control similar to a legacy multi-panel design). In the context of TRP and positioning, mechanical beams may be captured as a "configurable" TRP orientation. Additional signaling, relative to a PRS, may be supported in terms of switching times for different desirable beams in situations where the network cannot assume that the device supports electronic-based control. Accordingly, the server (in the context of multi-cell operation) may optimize resource allocation and multi-cell cooperation.

Figure 8:
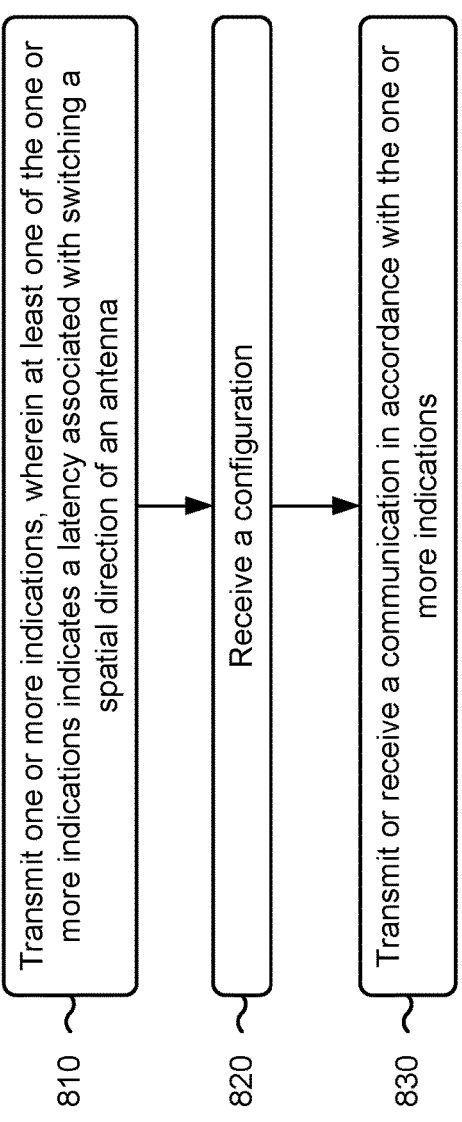
FIG. 8 is a diagram illustrating an example process performed, for example, at a UE or an apparatus of a UE, in accordance with the present disclosure.

FIG. 8 is a diagram illustrating an example process 800 performed, for example, at a UE or an apparatus of a UE, in accordance with the present disclosure. Example process 800 is an example where the apparatus or the UE (e.g., UE 120) performs operations associated with a mechanical state configuration.

As shown in FIG. 8, in some aspects, process 800 may include transmitting one or more indications (block 810). For example, the UE (e.g., using transmission component 1104 and/or communication manager 1106, depicted in FIG. 11) may transmit one or more indications. In some aspects, at least one of the one or more indications indicates a latency associated with switching a spatial direction of an antenna.

As further shown in FIG. 8, in some aspects, process 800 may include receiving a configuration (block 820). For example, the UE (e.g., using reception component 1102 and/or communication manager 1106, depicted in FIG. 11) may receive a configuration, as described above.

As further shown in FIG. 8, in some aspects, process 800 may include transmitting or receiving a communication in accordance with the configuration and the one or more indications (block 830). For example, the UE (e.g., using reception component 110, transmission component 1104, and/or communication manager 1106, depicted in FIG. 11) may transmit or receive a communication in accordance with the configuration and the one or more indications, as described above.

Process 800 may include additional aspects, such as any single aspect or any combination of aspects described below and/or in connection with one or more other processes described elsewhere herein.

In a first aspect, at least one of the one or more indications includes one or more of a count of a number of mechanical states (the mechanical states including one or more of a first state or a second state), a spatial direction associated with the first state, a spatial direction associated with the second state, a state association, a reference signal indication, an indication for a group of reference signals associated with a network node, a cell served by the network node, a cell served by a neighbor node, or a latency value.

In a second aspect, alone or in combination with the first aspect, the latency value is associated with mechanically switching from the first state to the second state when switching the spatial direction.

In a third aspect, alone or in combination with one or more of the first and second aspects, the latency value is associated with mechanically switching from a first direction to a second direction, wherein both the first direction and the second direction are associated with the first state.

In a fourth aspect, alone or in combination with one or more of the first through third aspects, at least one of the one or more indications includes a state pattern that includes the first state and the second state.

In a fifth aspect, alone or in combination with one or more of the first through fourth aspects, the state pattern includes one or more of a time or periodicity for one or more of the first state or the second state.

In a sixth aspect, alone or in combination with one or more of the first through fifth aspects, at least one of the one or more indications includes one or more of a capability signal, a measurement report, or UE assistance information.

In a seventh aspect, alone or in combination with one or more of the first through sixth aspects, the configuration includes one or more of a measurement gap configuration, a reference signal measurement configuration, a scheduling grant, a resource configuration, a timer configuration, a network node configuration, or an instruction to switch to a resource.

In an eighth aspect, alone or in combination with one or more of the first through seventh aspects, at least one of the one or more indications is associated with one or more of a downlink communication, an uplink communication, or a sidelink communication.

In a ninth aspect, alone or in combination with one or more of the first through eighth aspects, at least one of the one or more indications is transmitted via RRC signaling, MAC-CE signaling, or DCI.

In a tenth aspect, alone or in combination with one or more of the first through ninth aspects, the configuration is received via RRC signaling, MAC-CE signaling, or DCI.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
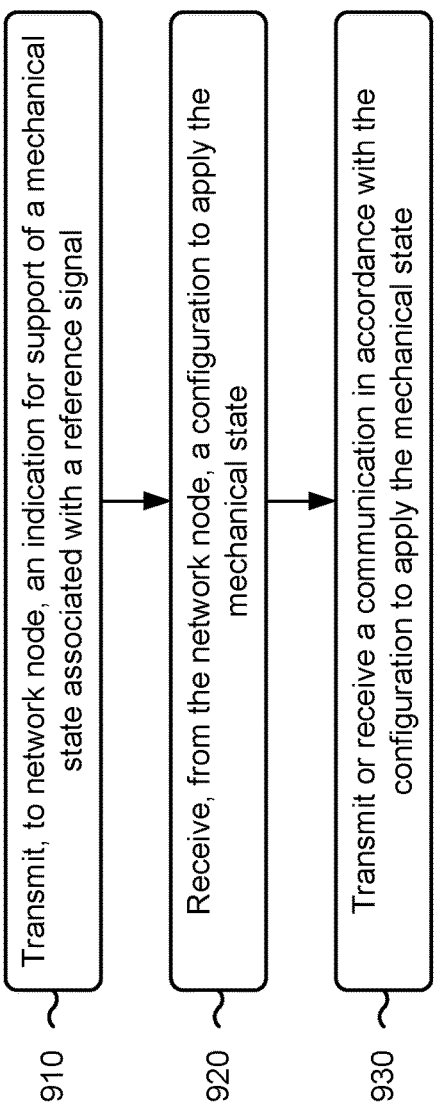
FIG. 9 is a diagram illustrating an example process performed, for example, at a UE or an apparatus of a UE, in accordance with the present disclosure.

FIG. 9 is a diagram illustrating an example process 900 performed, for example, at a UE or an apparatus of a UE, in accordance with the present disclosure. Example process 900 is an example where the apparatus or the UE (e.g., UE 120) performs operations associated with a mechanical state configuration.

As shown in FIG. 9, in some aspects, process 900 may include transmitting, to a network node, an indication for support of a mechanical state associated with a reference signal (block 910). For example, the UE (e.g., using transmission component 1104 and/or communication manager 1106, depicted in FIG. 11) may transmit, to a network node, an indication for support of a mechanical state associated with a reference signal, as described above.

As further shown in FIG. 9, in some aspects, process 900 may include receiving, from the network node, a configuration to apply the mechanical state (block 920). For example, the UE (e.g., using reception component 1102 and/or communication manager 1106, depicted in FIG. 11) may receive, from the network node, a configuration to apply the mechanical state, as described above.

As further shown in FIG. 9, in some aspects, process 900 may include transmitting or receiving a communication in accordance with the configuration to apply the mechanical state (block 930). For example, the UE (e.g., using reception component 1102, transmission component 1104, and/or communication manager 1106, depicted in FIG. 11) may transmit or receive a communication in accordance with the configuration to apply the mechanical state, as described above.

Process 900 may include additional aspects, such as any single aspect or any combination of aspects described below and/or in connection with one or more other processes described elsewhere herein.

In a first aspect, to transmit the indication for support of the mechanical state to the network node, the one or more processors are configured to transmit the indication to a CU or a DU of the network node.

In a second aspect, alone or in combination with the first aspect, to transmit the indication for support of the mechanical state to the network node, the one or more processors are configured to transmit the indication to a location management function.

In a third aspect, alone or in combination with one or more of the first and second aspects, the configuration to apply the mechanical state includes one or more rules for receiving a positioning reference signal.

In a fourth aspect, alone or in combination with one or more of the first through third aspects, the configuration to apply the mechanical state includes rules for transmitting an SRS.

In a fifth aspect, alone or in combination with one or more of the first through fourth aspects, the configuration to apply the mechanical state includes rules for applying a latency value to the communication, wherein the latency value is based on the mechanical state.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a diagram illustrating an example process 1000 performed, for example, at a first network node or an apparatus of a first network node, in accordance with the present disclosure. Example process 1000 is an example where the apparatus or the first network node (e.g., first network node 110) performs operations associated with a mechanical state configuration.

As shown in FIG. 10, in some aspects, process 1000 may include transmitting, to a second network node, an indication for support of a mechanical state associated with a reference signal (block 1010). For example, the first network node (e.g., using transmission component 1204 and/or communication manager 1206, depicted in FIG. 12) may transmit, to a second network node, an indication for support of a mechanical state associated with a reference signal, as described above.

As further shown in FIG. 10, in some aspects, process 1000 may include receiving, from the second network node, a configuration to apply the mechanical state (block 1020). For example, the first network node (e.g., using reception component 1202 and/or communication manager 1206, depicted in FIG. 12) may receive, from the second network node, a configuration to apply the mechanical state, as described above.

As further shown in FIG. 10, in some aspects, process 1000 may include transmitting or receiving a communication in accordance with the configuration to apply the mechanical state (block 1030). For example, the first network node (e.g., using reception component 1202, transmission component 1204, and/or communication manager 1206, depicted in FIG. 12) may transmit or receive a communication in accordance with the configuration to apply the mechanical state, as described above.

Process 1000 may include additional aspects, such as any single aspect or any combination of aspects described below and/or in connection with one or more other processes described elsewhere herein.

In a first aspect, the second network node is a CU of the first network node.

In a second aspect, alone or in combination with the first aspect, the second network node is a location management function.

In a third aspect, alone or in combination with one or more of the first and second aspects, the configuration to apply the mechanical state includes rules for transmitting a positioning reference signal.

In a fourth aspect, alone or in combination with one or more of the first through third aspects, the configuration to apply the mechanical state includes rules for receiving an SRS.

In a fifth aspect, alone or in combination with one or more of the first through fourth aspects, the configuration to apply the mechanical state includes rules for applying a latency value to the communication, wherein the latency value is based on the mechanical state.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 140 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 4-7. Additionally, or alternatively, the apparatus 1100 may be configured to perform one or more processes described herein, such as process 800 of FIG. 8, process 900 of FIG. 9, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, one or more modems, one or more demodulators, one or more MIMO detectors, one or more receive processors, one or more controllers/processors, one or more memories, or a combination thereof, of the UE described in connection with FIG. 2.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, one or more modems, one or more modulators, one or more transmit MIMO processors, one or more transmit processors, one or more controllers/processors, one or more memories, or a combination thereof, of the UE described in connection with FIG. 2. In some aspects, the transmission component 1104 may be co-located with the reception component 1102 in one or more transceivers.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The transmission component 1104 may transmit one or more indications. At least one of the one or more indications may indicate one or more of a spatial direction or a latency associated with switching the spatial direction. The reception component 1102 may receive a configuration. The transmission component 1104 or the reception component 1102 may transmit or receive, respectively, a communication in accordance with the configuration and one or more of the first state or the second state as indicated by the second indication.

The transmission component 1104 may transmit, to a network node, an indication for support of a mechanical state associated with a reference signal. The reception component 1102 may receive, from the network node, a configuration to apply the mechanical state. The transmission component 1104 or the reception component 1102 may transmit or receive, respectively, a communication in accordance with the configuration to apply the mechanical state.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

FIG. 12 is a diagram of an example apparatus 1200 for wireless communication, in accordance with the present disclosure. The apparatus 1200 may be a first network node, or a first network node may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 150 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIGS. 4-7. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the first network node described in connection with FIG. 2. Additionally, or alternatively, one or more components shown in FIG. 12 may be implemented within one or more components described in connection with FIG.

2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, one or more modems, one or more demodulators, one or more MIMO detectors, one or more receive processors, one or more controllers/processors, one or more memories, or a combination thereof, of the first network node described in connection with FIG. 2. In some aspects, the reception component 1202 and/or the transmission component 1204 may include or may be included in a network interface. The network interface may be configured to obtain and/or output signals for the apparatus 1200 via one or more communications links, such as a backhaul link, a midhaul link, and/or a fronthaul link.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, one or more modems, one or more modulators, one or more transmit MIMO processors, one or more transmit processors, one or more controllers/processors, one or more memories, or a combination thereof, of the first network node described in connection with FIG. 2. In some aspects, the transmission component 1204 may be co-located with the reception component 1202 in one or more transceivers.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The transmission component 1204 may transmit, to a second network node, an indication for support of a mechanical state associated with a reference signal. The reception component 1202 may receive, from the second network node, a configuration to apply the mechanical state. The transmission component 1204 or the reception component 1202 may transmit or receive, respectively, a communication in accordance with the configuration to apply the mechanical state.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a UE, comprising: transmitting one or more indications, wherein at least one of the one or more indications indicates a latency associated with switching a spatial direction of an antenna; receiving a configuration; and transmitting or receiving a communication in accordance with the configuration and the one or more indications.

Aspect 2: The method of Aspect 1, wherein at least one of the one or more indications includes one or more of: a count of a number of mechanical states, the mechanical states including one or more of a first state or a second state; a spatial direction associated with the first state; a spatial direction associated with the second state; a state association; a reference signal indication; an indication for a group of reference signals associated with a network node; a cell served by the network node; a cell served by a neighbor node; or a latency value.

Aspect 3: The method of Aspect 2, wherein the latency value is associated with mechanically switching from the first state to the second state when switching the spatial direction.

Aspect 4: The method of Aspect 2, wherein the latency value is associated with mechanically switching the spatial direction from a first direction to a second direction, wherein both the first direction and the second direction are associated with the first state.

Aspect 5: The method of any of Aspects 1-4, wherein at least one of the one or more indications includes a state pattern that includes the first state and the second state.

Aspect 6: The method of Aspect 5, wherein the state pattern includes one or more of a time or periodicity for one or more of the first state or the second state.

Aspect 7: The method of any of Aspects 1-6, wherein at least one of the one or more indications includes one or more of a capability signal, a measurement report, or UE assistance information.

Aspect 8: The method of any of Aspects 1-7, wherein the configuration includes one or more of a measurement gap configuration, a reference signal measurement configuration, a scheduling grant, a resource configuration, a timer configuration, a network node configuration, or an instruction to switch to a resource.

Aspect 9: The method of any of Aspects 1-8, wherein at least one of the one or more indications is associated with one or more of a downlink communication, an uplink communication, or a sidelink communication.

Aspect 10: The method of any of Aspects 1-9, wherein at least one of the one or more indications is transmitted via remote RRC signaling, MAC-CE signaling, or DCI.

Aspect 11: The method of any of Aspects 1-10, wherein the configuration is received via RRC signaling, MAC-CE signaling, or DCI.

Aspect 12: A method of wireless communication performed by a UE, comprising: transmitting, to a network node, an indication for support of a mechanical state associated with a reference signal; receiving, from the network node, a configuration to apply the mechanical state; and transmitting or receiving a communication in accordance with the configuration.

Aspect 13: The method of Aspect 12, wherein transmitting the indication for support of the mechanical state to the network node, includes transmitting the indication to a CU or a DU of the network node.

Aspect 14: The method of any of Aspects 12-13, wherein transmitting the indication for support of the mechanical state to the network node, includes transmitting the indication to a location management function.

Aspect 15: The method of any of Aspects 12-14, wherein the configuration to apply the mechanical state includes one or more rules for receiving a positioning reference signal.

Aspect 16: The method of any of Aspects 12-15, wherein the configuration to apply the mechanical state includes rules for transmitting an SRS.

Aspect 17: The method of any of Aspects 12-16, wherein the configuration to apply the mechanical state includes rules for applying a latency value to the communication, wherein the latency value is based on the mechanical state.

Aspect 18: A method of wireless communication performed by a first network node, comprising: transmitting, to a second network node, an indication for support of the mechanical state associated with a reference signal; receiving, from the second network node, a configuration to apply the mechanical state; and transmitting or receiving a communication in accordance with the configuration.

Aspect 19: The method of Aspect 18, wherein the second network node is a CU of the first network node.

Aspect 20: The method of any of Aspects 18-19, wherein the second network node is a location management function.

Aspect 21: The method of any of Aspects 18-20, wherein the configuration to apply the mechanical state includes rules for transmitting a positioning reference signal.

Aspect 22: The method of any of Aspects 18-21, wherein the configuration to apply the mechanical state includes rules for receiving a sounding reference signal (SRS).

Aspect 23: The method of any of Aspects 18-22, wherein the configuration to apply the mechanical state includes rules for applying a latency value to the communication, wherein the latency value is based on the mechanical state.

Aspect 24: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-23.

Aspect 25: An apparatus for wireless communication at a device, the apparatus comprising one or more memories and one or more processors coupled to the one or more memories, the one or more processors configured to cause the device to perform the method of one or more of Aspects 1-23.

Aspect 26: An apparatus for wireless communication, the apparatus comprising at least one means for performing the method of one or more of Aspects 1-23.

Aspect 27: A non-transitory computer-readable medium storing code for wireless communication, the code comprising instructions executable by one or more processors to perform the method of one or more of Aspects 1-23.

Aspect 28: A non-transitory computer-readable medium storing a set of instructions for wireless communication, the set of instructions comprising one or more instructions that, when executed by one or more processors of a device, cause the device to perform the method of one or more of Aspects 1-23.

Aspect 29: A device for wireless communication, the device comprising a processing system that includes one or more processors and one or more memories coupled with the one or more processors, the processing system configured to cause the device to perform the method of one or more of Aspects 1-23.

Aspect 30: An apparatus for wireless communication at a device, the apparatus comprising one or more memories and one or more processors coupled to the one or more memories, the one or more processors individually or collectively configured to cause the device to perform the method of one or more of Aspects 1-23.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based on or otherwise in association with" unless explicitly stated otherwise. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. A user equipment (UE) for wireless communication, comprising:
   one or more memories; and
   one or more processors, coupled to the one or more memories, configured to cause the UE to:
      transmit one or more indications, wherein at least one of the one or more indications indicates a latency associated with switching, based at least in part on a change of a mechanical state of an antenna, a spatial direction of the antenna;
      receive a configuration; and
      transmit or receive a communication in accordance with the configuration and the one or more indications.

2. The UE of claim 1,
   wherein the mechanical state comprises a first mechanical state, and at least one of the one or more indications includes one or more of:
      a count of a number of mechanical states, the mechanical states including one or more of the first state or a second state;
      a spatial direction associated with the first state;
      a spatial direction associated with the second state;
      a state association;
      a reference signal indication;
      an indication for a group of reference signals associated with a network node, a cell served by the network node, or a cell served by a neighbor node; or
      a latency value.

3. The UE of claim 2,
   wherein the latency value is associated with mechanically switching from the first state to the second state when switching the spatial direction.

4. The UE of claim 2,
   wherein the latency value is associated with switching the spatial direction from a first direction to a second direction, wherein both the first direction and the second direction are associated with the first state.

5. The UE of claim 1,
   wherein at least one of the one or more indications includes a state pattern that includes a first state and a second state.

6. The UE of claim 5,
   wherein the state pattern includes one or more of a time or periodicity for one or more of the first state or the second state.

7. The UE of claim 1,
   wherein at least one of the one or more indications includes one or more of a capability signal, a measurement report, or UE assistance information.

8. The UE of claim 1,
   wherein the configuration includes one or more of a measurement gap configuration, a reference signal measurement configuration, a scheduling grant, a resource configuration, a timer configuration, a network node configuration, or an instruction to switch to a resource.

9. The UE of claim 1,
   wherein at least one of the one or more indications is associated with one or more of a downlink communication, an uplink communication, or a sidelink communication.

10. The UE of claim 1,
   wherein at least one of the one or more indications is transmitted via remote resource control (RRC) signaling, a medium access control (MAC) control element (CE) (MAC-CE) signaling, or downlink control information (DCI).

11. The UE of claim 1,
   wherein the configuration is received via remote resource control (RRC) signaling, a medium access control (MAC) control element (CE) (MAC-CE) signaling, or downlink control information (DCI).

12. A UE for wireless communication, comprising:
   one or more memories; and
   one or more processors, coupled to the one or more memories, configured to cause the UE to:
      transmit, to a network node, an indication for support of a mechanical state of an antenna, the mechanical state associated with a reference signal;
      receive, from the network node, a configuration to apply the mechanical state of the antenna in accordance with a change of the mechanical state; and
      transmit or receive a communication in accordance with the configuration.

13. The UE of claim 12, wherein, to transmit the indication for support of the mechanical state to the network node, the one or more processors are configured to transmit the indication to a centralized unit (CU) or a distributed unit (DU) of the network node.

14. The UE of claim 12, wherein, to transmit the indication for support of the mechanical state to the network node, the one or more processors are configured to transmit the indication to a location management function.

15. The UE of claim 12,
   wherein the configuration to apply the mechanical state includes one or more rules for one or more of receiving a positioning reference signal or transmitting a sounding reference signal (SRS).

16. The UE of claim 12, wherein the configuration to apply the mechanical state includes rules for applying a latency value to the communication, wherein the latency value is based on the mechanical state.

17. A first network node for wireless communication, comprising:

one or more memories; and one or more processors, coupled to the one or more memories, configured to cause the first network node to:

transmit, to a second network node, an indication for support of a mechanical state of an antenna, the mechanical state associated with a reference signal;

receive, from the second network node, a configuration to apply the mechanical state of the antenna in accordance with a change of the mechanical state; and transmit or receive a communication in accordance with the configuration.

18. The first network node of claim 17, wherein the second network node is one or more of a centralized unit (CU) of the first network node or a location management function.

19. The first network node of claim 17, wherein the configuration to apply the mechanical state includes rules for one or more of transmitting a positioning reference signal or receiving a sounding reference signal (SRS).

20. The first network node of claim 17, wherein the configuration to apply the mechanical state includes rules for applying a latency value to the communication, wherein the latency value is based on the mechanical state.

\* \* \* \* \*